United States Patent
Basu et al.

(10) Patent No.: US 12,271,429 B2
(45) Date of Patent: Apr. 8, 2025

(54) QUANTIFYING AND IMPROVING THE PERFORMANCE OF COMPUTATION-BASED CLASSIFIERS

(71) Applicant: ADOBE INC., San Jose, CA (US)

(72) Inventors: Debraj Debashish Basu, Sunnyvale, CA (US); Ganesh Satish Mallya, Santa Clara, CA (US); Shankar Venkitachalam, Santa Clara, CA (US); Deepak Pai, Sunnyvale, CA (US)

(73) Assignee: Adobe Inc., San Jose, CA (US)

(*) Notice: Subject to any disclaimer, the term of this patent is extended or adjusted under 35 U.S.C. 154(b) by 1059 days.

(21) Appl. No.: 17/203,300

(22) Filed: Mar. 16, 2021

(65) Prior Publication Data

US 2022/0300557 A1    Sep. 22, 2022

(51) Int. Cl.
| | |
|---|---|
| *G06F 16/906* | (2019.01) |
| *G06F 16/901* | (2019.01) |
| *G06F 16/9035* | (2019.01) |
| *G06N 5/02* | (2023.01) |

(52) U.S. Cl.
CPC ........ *G06F 16/906* (2019.01); *G06F 16/9027* (2019.01); *G06F 16/9035* (2019.01); *G06N 5/02* (2013.01)

(58) Field of Classification Search
CPC ........ G06N 5/02; G06N 20/00; G06F 16/906; G06F 16/9035; G06F 16/9027
USPC ........................................................ 706/20
See application file for complete search history.

(56) References Cited

U.S. PATENT DOCUMENTS

| 10,037,480 | B2 * | 7/2018 | van den Hengel . G06F 18/2323 |
|---|---|---|---|
| 2018/0144269 | A1 * | 5/2018 | Wilson .................... G06N 5/022 |
| 2018/0240031 | A1 * | 8/2018 | Huszar .................... G06N 3/045 |
| 2019/0279085 | A1 * | 9/2019 | Umeda ...................... G06N 3/08 |
| 2020/0334553 | A1 * | 10/2020 | Yoon ......................... G06N 5/02 |
| 2021/0232966 | A1 * | 7/2021 | Elisha .................... G06Q 10/10 |

(Continued)

OTHER PUBLICATIONS

Prijatelj, Derek S., Mel McCurrie and Walter J. Scheirer. "A Bayesian Evaluation Framework for Ground Truth-Free Visual Recognition Tasks." ArXiv abs/2007.06711 (2020): n. pag. (Year: 2020).*

(Continued)

*Primary Examiner* — Chau T Nguyen
(74) *Attorney, Agent, or Firm* — Shook, Hardy & Bacon L.L.P.

(57) ABSTRACT

Enhanced methods for improving the performance of classifiers are described. A ground-truth labeled dataset is accessed. A classifier predicts a predicted label for datapoints of the dataset. A confusion matrix for the dataset and classifier is generated. A credibility interval is determined for a performance metric for each label. A first labels with a sufficiently large credibility interval is identified. A second label is identified, where the classifier is likely to confuse, in its predictions, the first label with the second label. The identification of the second label is based on instances of incorrect label predictions of the classifier for the first and/or the second labels. The classifier is updated based on a new third label that includes an aggregation of the first label and the second label. The updated classifier model predicts the third label for any datapoint that the classifier previously predicted the first or second labels.

20 Claims, 6 Drawing Sheets

(56) References Cited

U.S. PATENT DOCUMENTS

2021/0398025 A1* 12/2021 Yamamoto ............ G06F 16/906
2021/0406608 A1* 12/2021 Levanony ............... G06F 17/16

OTHER PUBLICATIONS

Davis, J., Liang, T., Enouen, J., Ilin, R. (2019). Hierarchical Semantic Labeling with Adaptive Confidence. In: Bebis, G., et al. Advances in Visual Computing. ISVC 2019. Lecture Notes in Computer Science(), vol. 11845. Springer, Cham. (Year: 2019).*

Mats G. Gustafsson, Mikael Wallman, Ulrika Wickenberg Bolin, Hanna Göransson, M. Fryknäs, Claes R. Andersson, Anders Isaksson, Improving Bayesian credibility intervals for classifier error rates using maximum entropy empirical priors, Artificial Intelligence in Medicine, vol. 49, Issue, pp. 93-104. (Year: 2010).*

Berrar, Daniel P. et al., "Significance tests or confidence intervals: which are preferable for the comparison of classifiers?" Journal of Experimental & Theoretical Artificial Intelligence 25: 189-206. (Year: 2013).*

Ji, Disi, Robert L. Logan, Padhraic Smyth, and Mark Steyvers. "Active bayesian assessment of black-box classifiers." In Proceedings of the AAAI Conference on Artificial Intelligence, vol. 35, No. 9, pp. 7935-7944. 2021. (Year: 2021).*

Saunders, Craig, Alex Gammerman, and Volodya Vovk. "Transduction with confidence and credibility." (1999): 722-726. (Year: 1999).*

Dallas Card, Michael Zhang, and Noah A. Smith. 2019. Deep Weighted Averaging Classifiers. In Proceedings of the Conference on Fairness, Accountability, and Transparency (FAT* '19). Association for Computing Machinery, New York, NY, USA, 369-378. (Year: 2019).*

Tötsch, Niklas & Hoffmann, Daniel. (2020). Classifier uncertainty: evidence, potential impact, and probabilistic treatment. (Year: 2020).*

Wikipedia, "Credible Interval," archived Mar. 5, 2020, 3 pages. (Year: 2020).*

Glenn Shafer and Vladimir Vovk. 2008. A Tutorial on Conformal Prediction. J. Mach. Learn. Res. 9 (Jun. 1, 2008), 371-421. (Year: 2008).*

Grandini, Margherita, Enrico Bagli, and Giorgio Visani. "Metrics for multi-class classification: an overview." arXiv preprint arXiv:2008.05756 (2020). (Year: 2020).*

Lanchantin, Jack et al. "Neural message passing for multi-label classification." In Machine Learning and Knowledge Discovery in Databases: European Conf., ECML PKDD 2019, Würzburg, Germany, Sep. 16-20, 2019, Proceedings, Part II, pp. 138-163. Springer International Publishing, 2020. (Year: 2019).*

Wu, Y., Feng, S., & Wang, Y. (2023). Semantic-aware graph matching mechanism for multi-label image recognition. IEEE Transactions on Circuits and Systems for Video Technology, 33(11), 6788-6803. (Year: 2023).*

Ran Wang, Suhe Ye, Ke Li, Sam Kwong, Bayesian network based label correlation analysis for multi-label classifier chain, Information Sciences, vol. 554, 2021, pp. 256-275. (Year: 2021).*

R. Kihlman and M. Fasli, "Multi-label Co-training using a Graph neural network.," 2023 IEEE International Conference on Big Data (BigData), Sorrento, Italy, 2023, pp. 5826-5834 (Year: 2023).*

Goutte, C., & Gaussier, E. (Mar. 2005). A probabilistic interpretation of precision, recall and F-score, with implication for evaluation. In European conference on information retrieval (pp. 345-359). Springer, Berlin, Heidelberg.

Efron, B., & Tibshirani, R. J. (1994). An introduction to the bootstrap. CRC press.

Joulin, A., Grave, E., Bojanowski, P., & Mikolov, T. (2016). Bag of tricks for efficient text classification. arXiv preprint arXiv:1607.01759.

* cited by examiner

Input $D, m_q, \delta, M$
Output A list of groups
1: Initialize $V = \bar{V} = \emptyset$, List of Merges (LoM) = $\emptyset$
2: Compute $C(l_1, l_2) \; \forall l_1, l_2 \in L$
3: for $l \in L$ do CheckL($l$)
4: end for
5: if $V$ is $\emptyset$ then Stop and Return $L$
6: end if
7: Select $S \subseteq V$ with $|S| = \min\{|V|, M\}$ such that $S$ is the set of at most $M$ violators with largest $\Delta$
8: Initialize an empty undirected graph $G$
9: for $l \in S$ do Append the edge $(l, \mathcal{N}(l))$ to $G$ where $\mathcal{N}(l) := \arg\max_{l' \neq l, l' \notin \bar{V}} C(l, l')$
10: end for
11: UpdateLoM()
12: Update $D$ and $L$ using the dictionary LoM[-1]
13: Recompute $C(l_1, l_2)$ using $D$  ▷ This can be expedited by performing aggregations on the initial confusability matrix
14: $V \leftarrow V \setminus S$
15: $\bar{V} \leftarrow \bar{V} \cup (G \cap V)$
16: for each newly formed label $l$ do CheckL($l$)
17: end for
18: if $V$ is $\emptyset$ then Stop and Return Flatten(LoM, L)
19: else Repeat from Step 7.
20: end if

200

1: procedure CheckL($l$)
2:    if $\Delta(l, m_q) > \delta$ then
3:       $V \leftarrow V \cup \{l\}$
4:       Cache $\Delta(l, m_q)$
5:    else
6:       $\bar{V} \leftarrow \bar{V} \cup \{l\}$
7:    end if
8: end procedure

220

1: procedure UpdateLoM()
2:    Using depth first search, find the set of all connected components in $G$ given by $\{G_1, G_2, \ldots\}$
3:    Initialize an empty dictionary $dict = \{\}$
4:    for $g \in \{G_1, G_2, \ldots\}$ do
5:       Select an arbitrary $l \in g$
6:       for $l' \in \mathcal{N}(l)$ do
7:          $dict[l'] = l$
8:       end for
9:       LoM ← LoM $\cup$ $dict$
10:   end for
11: end procedure

240

1: procedure Flatten(LoM, L)
2:    Initialize empty directed graph $G$
3:    for $dict \in $ LoM do
4:       for (key, value) in $dict$ do Append edge $G \leftarrow G \cup (value \rightarrow key)$
5:       end for
6:    end for
7:    for $l \in L$ do Append edge $G \leftarrow G \cup ("root" \rightarrow l)$
8:    end for
9:    Initialize empty list of groups of labels groups
10:   for $c \in children("root")$ do groups ← groups $\cup$ list of nodes in subtree($c$)
11:   end for
12:   Return groups
13: end procedure

QUANTIFYING AND IMPROVING THE PERFORMANCE OF COMPUTATION-BASED CLASSIFIERS

BACKGROUND

The term "classifier" may refer to any computing platform, system, application, program, model, function, routine, and/or subroutine that takes an input "datapoint" and outputs a "label" for the datapoint. A classifier may "classify" input data (e.g., an input vector that encodes an object such as an image, natural language-based document, or other information) by assigning one or more possible labels to the data. It may be said that a classifier "predicts" and/or "assigns" one or more possible labels to a quanta of input data (e.g., a datapoint). A label may indicate, or otherwise be descriptive of, one or more features and/or attributes of the object encoded by the input data. The one or more labels may be included in a set of possible labels that the classifier is enabled to identify instances of within input data.

A classifier may be a binary classifier, where the set of labels includes two possible labels: e.g., "positive" (or 1) and "negative" (or 0). For example, a radiology-based classifier may classify a medical image as positive (e.g., when the image depicts a tumor) or negative (e.g., when the image does not depict a tumor). Other classifiers may be multi-label classifiers, where the set of labels includes more than two possible labels for the input data. For instance, a document classifier may analyze a document's content (e.g., text, images, audio, and/or video) and classify the document as pertaining to a particular academic subject, e.g., economics, law, philosophy, science, or mathematics. The multi-labels need not be mutually exclusive, e.g., a classifier may label a single datapoint with two or more labels from the set of labels. For example, an image classifier may detect multiple objects (e.g., subjects) depicted by an image: e.g., a dog, a cat, a car, a human, and the like. If both a cat and a dog are depicted within a single image, the image classifier may classify the image as both a "dog image" and a "cat image." It may be said that the classifier predicts two "predicted labels" for the datapoint: e.g., "dog" and "cat."

Rather than definitively assigning a label to a datapoint, some classifiers may assign probabilities and/or likelihoods for each of the possible labels. For instance, the image classifier may assign a 0.75 probability that the image depicts a dog and a 0.87 probability that the image depicts a cat. A classifier may definitively assign a label to a datapoint if the label's probability exceeds a probabilistic threshold (e.g., 0.85). Thus, in this example, the classifier may classify the image as a "dog image," but not assign the label of "cat image" to the image. In some scenarios, a classifier may employ a separate "probabilistic label threshold" to each of the separate possible labels.

Classifiers are now ubiquitously deployed in many computation-based applications, including but not limited to search engines, medical diagnostic applications, spam filtering, natural language processing, and numerous other applications. Classifiers may be prone to erroneously assigning (or failing to assign) labels to some datapoints, e.g., classifiers may exhibit non-zero Type I and/414 or Type II error rates. Thus, the issue of quantifying a classifier's performance is a growing concern.

SUMMARY

The various embodiments of the technology described herein are directed towards enhanced methods and systems for quantifying a classifier's performance with reduced statistical uncertainty in the quantification. Such quantifications may be performed in view of a ground-truth labeled dataset. Various embodiments may further be directed to refining and/or updating the classifier, in view of its quantified performance. When a size of a label's credibility interval is larger than a predetermined interval threshold, the performance of a label may be unacceptably uncertain and the label may be referred to as a violating label. In some embodiments, the number of additional datapoints (for the ground-truth labeled dataset) that would be required to decrease the credibility interval (to within an acceptable range) is iteratively determined.

The acquisition of additional datapoints corresponding to a violating label may not be a viable option in all circumstances. To address such a concern, various embodiments are directed towards aggregating (or merging) a violating label with one or more other labels, such that an aggregated label that includes the violating label is a non-violating label. The one or more other labels to merge with a violating label are determined by identifying other labels (from the set of labels) that the classifier is likely to "confuse" with the violating label. The likelihood of confusability between a pair of labels is quantified via a label-confusability metric for the pair of labels.

In this example, label A may be a violating label and the label-confusability metric for the label pair (e.g., {label A, label B}) is significant. In some embodiments, the label-confusability metric for the label pair is greater than the label-confusability metric for any of the other possible label pairings that include label A. Label A and label B may be aggregated (or merged) to form a new label (e.g., label C). The classifier may be updated in view of the aggregation of the labels. The updated classifier may predict label C for a datapoint that the classifier would have previously predicted as either label A or label B. The ground-truth label assignments of the dataset may be updated, such that any datapoint with the ground-truth label of either label A or label B is relabeled with the ground-truth label of label C.

The performance metric and the credibility interval of the new label C may be determined. If the credibility interval of label C is greater than the interval threshold, the various embodiments may iteratively identify one or more additional labels to merge with label C. The iterative aggregation of labels may continue until the size of the credibility interval of the merged labels is less than the interval threshold. Thus, the various embodiments iteratively improve the performance of a classifier until the credibility interval for each label is within an acceptable range.

BRIEF DESCRIPTION OF THE DRAWINGS

FIG. 2 illustrates pseudo-code for an exemplary process for merging labels that is consistent with the various embodiments;

DETAILED DESCRIPTION

Figure 1:
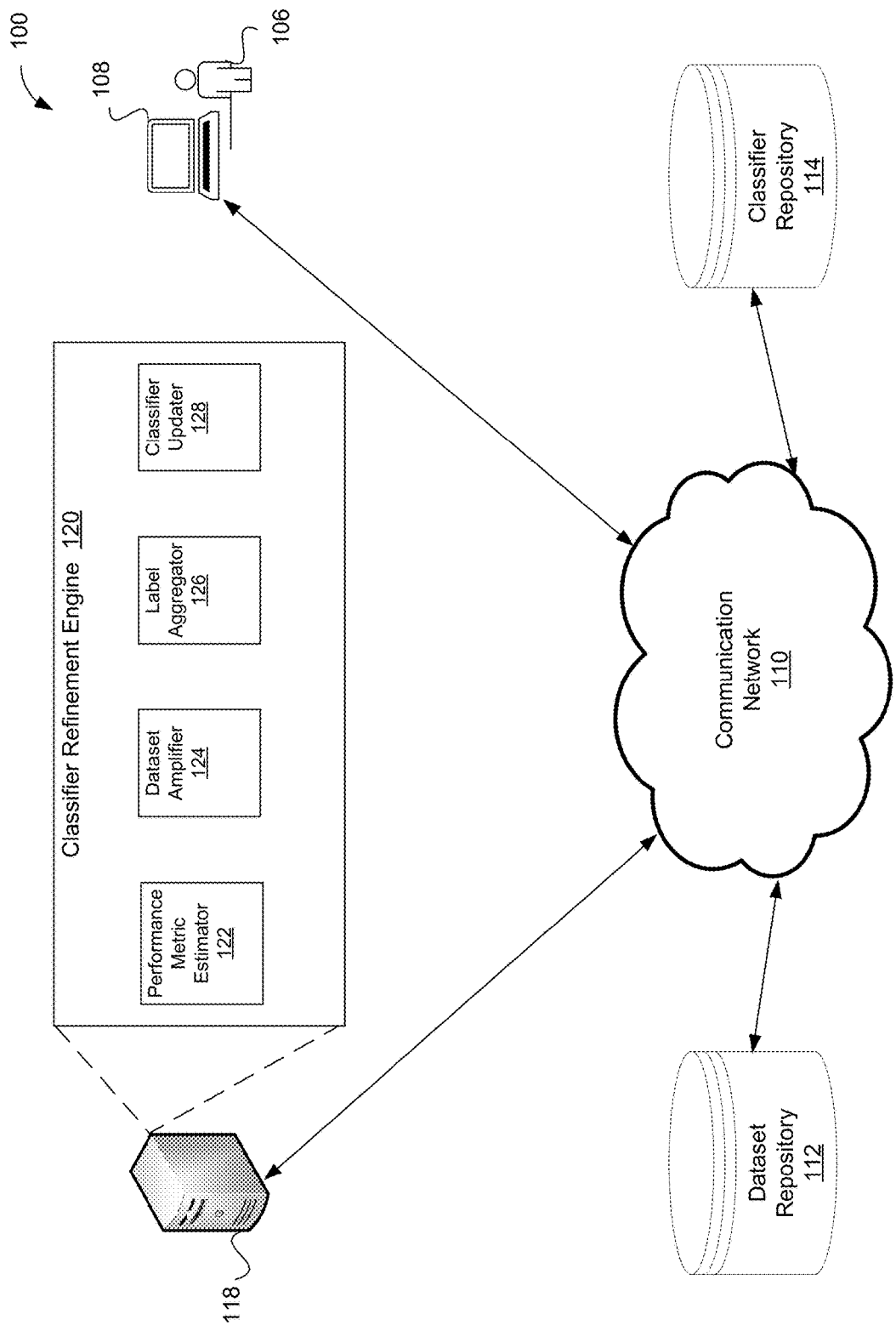
FIG. 1 illustrates a classifier refinement system implementing various embodiments presented herein.

A classifier (or classifier model) "classifies" an input datapoint (e.g., an input vector that encodes an object such as an image or document) by assigning one or more possible labels to the data, via the mapping functionality of the classifier. For instance, a classifier may receive $x \in \mathbb{R}^D$, as an input datapoint and assigns or one or more labels (e.g., an element of L') to the datapoint. A label may indicate, or otherwise be descriptive of, one or more features and/or attributes of the object encoded by the input data. The terms "classifier model" and "classifier" may be interchangeably used throughout.

More specifically, a classifier may include any computer-enabled mapping (f) from a first set or domain (e.g., the domain of datapoints) to a second set or domain, e.g., a domain that includes the set of all possible subsets of L, e.g., L'. That is, a classifier may be represented by the mapping notation: $f(x) \in L'$. For each label in the set of labels, the mapping may be a deterministic mapping. In other embodiments, the mapping may be a probabilistic mapping. In some multi-label deterministic embodiments, the mapping may be indicated by the notation: $f: \mathbb{R}^d \to 2^{|L|}$. In probabilistic embodiments, the mapping may be notated as: $f: \mathbb{R}^d \to [0,1]^{|L|}$, where each component of $[0,1]^{|L|}$ indicates a probability for a corresponding element of L (e.g., a label of the set of labels).

The label that a classifier assigns to a datapoint may be interpreted as a "prediction" of the classifier, and the one or more labels that a classifier predicts for the datapoint may be referred to as "predicted labels." As indicated above, a datapoint may be separately assigned a "ground-truth label" (e.g., an element of L'). The ground-truth label of a datapoint may be considered a predetermined "true" label for the datapoint. For instance, prior to being provided to a classifier, one or more individuals may assign input datapoints a "ground-truth label" that the individual considers to be the "true" label for the datapoint. Datapoints may be manually assigned "ground-truth" labels for the purposes of "training" a classifier. If a sufficiently large dataset is available (e.g., a dataset that includes a significant number of datapoints that have been previously labeled with ground-truths), the performance of a classifier may be estimated via a comparison of the data's ground-truth labels and the classifier's predicted labels for the datapoints. Such a comparison may indicate instances of true and false predictions for each label. The performance of a classifier may be indicated by one or more performance metrics (e.g., precision, recall, F1-score, and the like) that reflect the classifier's rate of true and false predictions.

For multi-label classifiers, the classifier may be treated as a binary classifier for each possible label of the set of labels. Thus, for each label of the set of labels, rates of "true positive" predictions, "true negative" predictions, "false positive" predictions (e.g., Type I errors), and "false negative" predictions (e.g., Type II errors) may be estimated via a sufficiently large "ground-truth labeled" dataset (e.g., $\mathcal{D}$ : $\{x_i, y_i\}_{i=1}^N$, where $x_i \in \mathbb{R}^D$ is the ith datapoint and $y_i \in 2^{|L|}$ is an integer corresponding ground-truth label, via a correspondence between the integers in the interval $[1, 2^{|L|}]$ and each of the $2^{|L|}$ possibilities of deterministic predictions for the classifier). That is, a classifier's performance for each of its possible labels may be estimated via a sufficiently large and uniform dataset, e.g., uniform across the distribution of the $2^{|L|}$ possibilities for ground-truth labeling of each datapoint in the dataset.

Standard statistical performance metrics such as precision, recall, and F1 score may be estimated for each label of the set of labels via statistical methods. Such estimations of performance metrics may be determined by comparing the classifier's predictions and the dataset's ground-truths. However, when sufficient numbers of "ground-truth" instances of datapoints for a particular label are unavailable, the estimate of a performance metric for the particular label may be statistically insignificant (e.g., a significant amount of statistical uncertainty is associated with the estimate). In many ground-truth labeled datasets, the distribution of ground-truth labels for the set of labels is relatively non-uniform. For some labels, statistically-significant number of instances of ground-truth labeled datapoints are available, while for other labels, only a small number of instances of ground-truth labeled datapoints are available. For example, a ground-truth labeled dataset (e.g., $\mathcal{D}$) may be available, where the ground truth labels (e.g., $y_i$) are non-uniformly distributed over the elements of L, or otherwise a statistically significant number of datapoints (e.g., $x_i$) with ground-truth assignments for one or more labels of L are unavailable in the dataset. If only a few instances of the datapoints are ground-truth labeled with the particular label (e.g., an element of L), then an estimate of a performance metric may have a large statistical uncertainty due to a lack of statistical significance.

As the cardinality of the set of possible labels increases, the generation of a dataset with a sufficiently statistically-significant number of datapoints for each possible label may become increasingly difficult, e.g., a sufficiently uniform ground-truth labeled dataset may not be readily available. As such, it is likely that at least for some labels of the set of labels, an estimate of a performance metric may come with a significant uncertainty. Many applications of classifiers are sufficiently sensitive to false positive and false negative rates, as indicated by various performance metrics. For instance, employing a medical diagnostic classifier (e.g., a diagnostic screening test for viral particles) with a large false negative rate may be unacceptable from a public health standpoint. As another example, employing a spam-detection classifier with a large false positive rate may be unacceptable in a spam filtering application. Without sufficient knowledge of a classifier's performance, the deployment of the classifier may be problematic for many applications. As noted above, when a dataset that is statistically significant for each of the possible labels is not available, the uncertainty in an estimate of the classifier's performance may be significant.

Furthermore, many (but not all) classifiers are generated via supervised machine learning (ML) methods. For instance, a classifier may be generated by employing a ground-truth labeled dataset (e.g., $\mathcal{D}$ : $\{x_i, y_i\}_{i=1}^N$). If the training dataset is skewed (e.g., the distribution of ground-truth labels is significantly non-uniform), then the training of the model may be biased. That is, the trained model will be biased towards those labels that are over-represented in the training dataset and biased against the labels that are under-represented in the dataset. Thus, a classifier may be a "biased" classifier when trained via a skewed training dataset. The performance of a "biased" classifier may be less than adequate for a given application. As the cardinality of the set of possible label increases, the bias of a classifier may also increase due to an increase in the non-uniformity (or skewness) of the training data employed to train the classifier.

An example of a classifier with an exceptionally large set of possible labels may be an image classifier for facial recognition applications. Furthermore, the ground-truth labeled data available for training such a classifier may be highly skewed. That is, instances of ground-truth labeled images for a first sub-population (of the population of individuals of which one is interested in performing facial recognition of) may be more widely available than instances of ground-truth images for a second sub-population. Obviously, employing a highly biased image classifier for facial recognition would violate many social norms.

Classifiers are now ubiquitously deployed in many applications, including but not limited to search engines, medical diagnostic applications, spam filtering, natural language processing, facial recognition, and numerous other applications. Furthermore, the cardinality of the associated set of labels for some of these classifiers continues to grow and now exceeds hundreds of possible labels for some classifiers. Thus, the issues of classifier bias and uncertain estimates of the performance of a classifier are growing concerns in the deployment of classifiers.

Briefly described, the various embodiments of the technology described herein are directed towards enhanced methods and systems for quantifying a classifier's performance with reduced statistical uncertainty in the quantification. Various embodiments may further be directed to refining and/or updating the classifier, in view of its quantified performance. The below discussion demonstrates that such updates and/or refinement of the classifier significantly improves the classifier's performance. More specifically, the embodiments statistically estimate various performance metrics (e.g., precision, recall, F1 score, area under the ROC curve, false negative rate, and the like) for each label of a classifier, in view of a ground-truth labeled dataset. The performance metric for each label is estimated via datapoints in the dataset that correspond to the label. In view of the statistical nature of determining a performance metric for a label, a statistical confidence and/or credibility level for the performance metric is determined. In some embodiments (e.g., embodiments that employ a Bayesian perspective), a credibility interval (or credibility range) is determined for the performance metric for each label, in view of a predetermined confidence value (q%). The embodiments are not so constrained and in other embodiments (e.g., embodiments that employ a Frequentist perspective), a confidence interval (or confidence range) may be determined for the performance metric for each label, in view of the predetermined confidence value.

Thus, the embodiments statistically quantify a classifier's performance for each label by estimating a value of a performance metric and an associated confidence and/or credibility of its estimation (e.g., a credibility or confidence interval for the estimation of the value of the performance metric for each of the classifier's labels). A label that has an unacceptable confidence and/or credibility level (e.g., a label with a substantially large statistical uncertainty) for the estimation of its performance metric (e.g., as determined via a comparison of the size of the confidence and/or credibility interval to an interval threshold) may be referred to as a "violating label." Whereas, a label with an acceptable confidence and/or credibility in the estimation of its performance metric (e.g., a label with a sufficiently small statistical uncertainty) may be referred to as a "non-violating label."

More specifically, when a size of a label's credibility or confidence interval is larger than a predetermined interval threshold, the performance of a label may be unacceptably uncertain (e.g., the estimation of its performance metric is statistically insignificant). For a violating label, there may be insufficient confidence or credibility in the estimation of the performance metric. In contrast, when the size of the label's credibility or confidence interval is less than the predetermined interval threshold, the quantification of the performance of the classifier for a non-violating label is relatively certain (e.g., the estimation of its performance metric is statistically significant). In other words, there is sufficient confidence or credibility in the estimation of the performance metric for a non-violating label. In some embodiments, the number of additional datapoints (corresponding to the label) that would be required to decrease the credibility or confidence interval (which increases the confidence in the estimate of the performance metric) to within an acceptable range is iteratively determined. For example, some embodiments determine a number of additional datapoints that would be required to be included in the dataset to transition a violating label to a non-violating label, via the estimation of its performance metric.

In some circumstances, the acquisition of additional datapoints corresponding to a violating label (e.g., to reduce the size of the violating label's credibility range to an acceptable interval) may not be a viable option. To address such a concern, various embodiments are directed towards improving the performance of the classifier by updating and/or refining the classifier. Such enhancements to the classifier may include aggregating (or merging) a violating label with one or more other labels, such that an aggregated label that includes the violating label is a non-violating label. The one or more other labels to merge with a violating label are determined by identifying other labels (from the set of labels) that the classifier is likely to "confuse" with the violating label. The likelihood of confusability between a pair of labels is quantified via a label-confusability metric for the pair of labels. For a pair of labels (e.g., label A and label B), the label-confusability metric may indicate a probability that the classifier erroneously predicts label B for a datapoint with a ground-truth of label A and/or erroneously predicts label A for a datapoint with a ground-truth of label B.

In this example, label A may be a violating label and the label-confusability metric for the label pair (e.g., {label A, label B}) is significant. In some embodiments, the label-confusability metric for the label pair is greater than the label-confusability metric for any of the other |L|−2 possible label pairings that include label A. Label B may or may not be a violating label. Label A and label B may be aggregated (or merged) to form a new label (e.g., label C which was not previously included the set of possible labels). The classifier may be updated and/or refined, in view of the aggregation of the labels. The updated classifier may predict label C for a datapoint that the classifier would have previously predicted as either label A or label B. The dataset may also be updated in view of the label merging. For instance, the ground-truth label assignments may be updated, such that any datapoint with the ground-truth label of either label A or label B is relabeled with the ground-truth label of label C.

The performance metric and the credibility interval of the new label C may be determined. If the credibility interval of label C is greater than the interval threshold, the various embodiments may iteratively identify one or more additional labels to merge with label C. The iterative aggregation of labels may continue until the size of the credibility interval of the merged labels is less than the interval threshold, e.g., the label that includes the merged labels is a non-violating label. The various embodiments may update the classifier by iteratively aggregating labels until no violating labels exist, in view of the dataset. Thus, the various embodiments iteratively improve the performance of a classifier until the credibility interval for each label is within an acceptable range.

Conventionally, a performance metric for a classifier may be determined, but the statistical uncertainty of the performance is unknown. Thus, a classifier may have conventionally been deployed without knowledge of the certainty of classifier's performance. For instance, poorly performing classifiers may have been conventionally deployed in applications without a sufficient understanding of the uncertainty of the classifier's predictions and/or the level of bias in the classifier's predictions. The various embodiments herein address these issues by not only estimating the performance of the classifier, but also providing a credibility interval for the estimate. Such a credibility interval provides a statistical measure of the credibility of the performance metric's estimation. Additionally, the embodiments address these shortcomings of conventional systems by providing an estimate of how many additional datapoints would be required to sufficiently decrease the credibility interval for any violating labels. Still additionally, the embodiments enhance the performance of conventional classifiers by providing methods of label merging, for labels that lack a sufficient number of datapoints required to estimate a performance metric with sufficient certainty. That is, the embodiments improve a classifier's performance for labels where the estimation of a performance metric lacks sufficient certainty.

EXAMPLE OPERATING ENVIRONMENT

FIG. 1 illustrates a classifier refinement system 100 implementing various embodiments presented herein. A client/server architecture is shown in FIG. 1, where server computing device 118 implements a classifier refinement engine 120. Classifier refinement engine 120 may serve classifier refinement requests from client computing device 108. User 106 may initiate such requests, via client computing device 108. Other embodiments may not be so constrained, e.g., client computing device 108 may implement a classifier refinement engine 120. Various embodiments of computing devices, such as but not limited to server computing device 118 and client computing device 108 are discussed in conjunction with computing device 600 of FIG. 6. In addition to computing devices, system 100 may include a communication network 110, as well as a dataset repository 112 and classifier repository 114. Dataset repository 112 may store and/or archive a plurality of ground-truth labeled datasets. Classifier repository 114 may store and/or archive a plurality of classifier models. Each classifier model stored in classifier repository 114 may be enabled to "classify" the datapoints in at least one dataset stored in dataset repository 112, via the set of possible labels for the classifier.

Communication network 110 may be a general or specific communication network and may communicatively couple server computing device 118, client computing device 108, dataset repository 112, and/or classifier repository 114. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way as to computing devices to exchange information via communication network 110.

User 106 may request, via a request from client computing device 108 to the server computing device 118, that the performance of a particular classifier (e.g., an implementation of a classifier model that is stored in classifier repository 114) be quantified in view of a corresponding particular dataset (e.g., a ground-truth labeled dataset stored in dataset repository 112). In the event that the quantification of the classifier's performance for one or more labels is unacceptably uncertain (e.g., one or more labels are violating labels), user 106 may request a refinement of the classifier, e.g., that the one or more violating labels are merged with one or more other labels, such that each of the refined classifier's labels is a non-violating label.

In view of such a request, the refinement engine 120 may be provided and/or have access to the classifier, as well as the corresponding ground-truth labeled dataset. For example, classifier refinement engine 120 may be provided with classifier model (f: $\mathbb{R}^d \to 2^{|L|}$) and dataset $\mathcal{D} : \{x_i, y_i\}_{i=1}^N$, where $x_i \in \mathbb{R}^D$ is the ith datapoint, $y_i \in 2^{|L|}$ is an integer corresponding ground-truth label and L is the set of possible labels. Classifier refinement engine 120 may additionally receive a selection of one or more performance metrics (e.g., recall, precision, false-positive rate, F1 score, area under the ROC curve, and the like), a confidence value (e.g., $q \in [0,1]$), and a interval threshold (e.g., $\delta$). In some embodiments, classifier refinement engine 120 may additionally receive a maximum number of labels to merge per iterations (e.g., M).

Classifier refinement engine 120 may include a performance metric estimator 122, a dataset amplifier 124, a label aggregator 126, and a classifier updater 128. Performance metric estimator 122 is generally responsible for estimating one or more performance metrics and an associated credibility interval (for the interval value) for each label of the set of labels. Performance metric estimator 122 may additionally identify any violating labels within the set of possible labels. Dataset amplifier 124 is generally responsible for determining a number of additional datapoints required to transition each violating labels to a non-violating label. That is, dataset amplifier 124 determines an "amplification factor" for each violating label. The amplification factor for a label may indicate the number of additional datapoints that are required for the label to transition the label from a violating label to a non-violating label. When the acquisition of such additional datapoints is not feasible or practical, label aggregator 126 may identify one or more labels to aggregate with (or merge with) each violating label, such that the aggregated label is a non-violating label. Classifier updater 128 is generally responsible for updating the classifier (and the dataset) in view of the label aggregation.

For the embodiments, the performance metrics are assumed as random variables. More specifically, the estimation of such performance metrics is viewed as a statistical sampling process, where the datapoints and labeling of the datapoints are assumed to be sampled from underlying distributions. A justification for such a probabilistic interpretation of the estimation of performance metrics is discussed in the following reference: Goutte C., Gaussier E. (2005) A *Probabilistic Interpretation of Precision, Recall and F-Score, with Implication for Evaluation.* In: Losada D.

E., Fernández-Luna J. M. (eds) Advances in Information Retrieval. ECIR 2005. Lecture Notes in Computer Science, vol 3408. Springer, Berlin, Heidelberg. https://doi.org/10.1007/978-3-540-31865-1_25. This reference is herein incorporated by reference in its entirety. Briefly, the datapoints in the dataset that correspond to a specific label of the set of labels are considered as random samples from an underlying distribution of datapoints corresponding to the specific label. The performance metric is calculated from the "sampled" datapoints (e.g., those that are available via the dataset). The calculated value of the performance metric is an estimate of a "true" (e.g., underlying) value of the performance metric. Based on the number of datapoints "sampled" from the underlying distribution (e.g., the number of datapoints that are available in the dataset that correspond to the label), a credibility interval for the performance metric may be determined.

Each datapoint of the dataset has a ground-truth label and a predicted label (e.g., predicted via the classifier). A multi-label classifier can be considered as a binary classifier for each label of a set of labels. Thus, for a particular label, the dataset may be transformed into $\mathcal{D} : \{x_i, y_i\}_{i=1}^N$, where $x_i \in \mathbb{R}^D$ is the ith datapoint, and $y_i \in \{0,1\}$ (e.g., $y_i=0$ indicates that the ith datapoint is not ground-truth labeled with the particular label and $y_i=1$ indicates that the ith datapoint is ground-truth labeled with the particular label. For the particular label, the classifier determines a corresponding label (e.g., $f(x_i) \to 0$ or $f(x_i) \to 1$) for the predicted label. The performance metric estimator 122 may generate a re-labeled dataset for each label (e.g., for each $l \in L$). The re-labeled dataset may be referenced as: $\hat{D}_l : \{x_i, y_i\}_{i=1}^N$, where $y_i=1$ if $x_i$ has a ground-truth label that includes l and $y_i=0$ if the ground-truth label for $x_i$ does not include l. Via a comparison between the ground-truth labels and the predicted labels, each datapoint falls into one of four categories (or buckets) for each label for the particular label: true positive (TP), true negative (TN), false positive (FP), and false negative (FN). For the particular label, the performance metric estimator 122 may generate a confusion matrix. A confusion matrix for the particular label (l) may be a 2×2 matrix shown below, where TP, TN, FN, and FP indicate the absolute numbers of true positive, true negative, false negative, and false positive datapoints are included in the dataset. Note that these absolute numbers may indicate corresponding probabilities: ($\pi_{TP}, \pi_{TN}, \pi_{FN}, \pi_{FP}$)

| $l \in L$ | $f(x_i) \to 1$ | $f(x_i) \to 1$ |
|---|---|---|
| $y_i = 1$ | TP | FN |
| $y_i = 0$ | FP | TN |

Thus, the components of a confusion matrix (for label l) indicate the number of instances of correct and incorrect label predictions for label l predicted by the classifier model. Such a confusion matrix may be generated for each label of the set of labels. The confusion matrices for the labels may be stored in a first data structure. In at least one embodiment, each of the |L| confusion matrices is encoded in single matrix, e.g., the |L| separate 2×2 matrices are merged into a single larger confusion matrix, a "complete" confusion matrix. A complete confusion matrix may be a |L|×|L| matrix that encodes the "confusion components" (e.g., TP, FN, FP, TN) for all |L| labels. The confusion matrices may be employed to calculate point estimates for the underlying distributions, i.e., the confusion matrices are employed to calculate statistical estimates of one or more performance metrics (precision, recall, F1-score, area under the ROC curve, and the like) for each label. In some embodiments, a "complete" confusion matrix may be generated and its components may be encoded in a data structure.

Some of the performance metrics employed by the various embodiments include (but are not limited to) precision, recall, true positive rate (TPR), false positive rate (FPR), F1 score, and area under the ROC curve (AUC-ROC). The precision (p(l)) of the classifier for label l (for $l \in L$) may be statistically estimated as: p(l)=TP/(TP+FP) and the recall (r(l)) may be statistically estimated as: r(l)=TP/(TP+FN). The recall may be referred to as the true positive rate (TPR) or sensitivity for the label. The false positive rate is defined as: FPR=FP/(FP+TN). The F1 score (F1)l) is defined as the harmonic mean (HM) of the precision and recall and may be estimated as: F1(l)=HM(p,r)=2·p·r/(p+r).

In some embodiments, a Bayesian perspective is assumed and the underlying distribution of the performance metrics may be assumed as a symmetric beta distribution. That is, it is assumed that an estimated value of the performance metric was sampled from a symmetric beta distribution of possible values for the performance metric. In such Bayesian embodiments, a "prior" estimation ($\lambda$) for the performance metric may be calculated via the above definitional expressions. As noted above, it is assumed that the underlying distribution of the values of a performance metric is a symmetric beta distribution, parameterized by $\lambda$, (e.g., Beta ($\lambda$, $\lambda$)), where the prior estimate is determined via the above definitional expressions. Bayes' theorem may be employed to update the prior estimated performance metric. In such embodiments, the estimate of the precision and recall (e.g., $\lambda$) may be updated as p~Beta(TP+$\lambda$, FP+$\lambda$) and r~Beta(TP+$\lambda$, FN+$\lambda$). A false positive rate ($f_{pr}$) and a false negative rate ($f_{nr}$=1−r) may be similarly estimated as: $f_{pr}$~Beta(FP+$\lambda$, TN+$\lambda$) and $f_{nr}$~Beta(FN+$\lambda$, TP+$\lambda$). The false positive rate and the false negative rated may be alternatively indicated as FPR and FNR throughout.

A credibility interval for a random variable may be indicated as: [$r_{lo}$, $r_{up}$], where $r_{lo}$ and $r_{up}$ are the upper and lower bounds of the interval. The size of the interval may be determined as: $r_{up}$−$r_{lo}$. For a random variable (R) that is distributed via a beta distribution (e.g., R~Beta(a, b)), the upper and lower bounds of its credibility interval (for a predetermined confidence value $q \in [0,1]$) may be calculated as: $r_{lo}=F_R^{-1}(0.5\cdot(1-q))$ and $r_{up}=F_R^{-1}(0.5\cdot(1+q))$, where $F_R(z)=\Pr(R \le z)$. Thus, the credibility interval for the precision, recall, false positive rate, and false negative rate (for the predetermined confidence value q) may be determined by calculating the lower and upper bounds of the interval via these expressions.

For the F1 score performance metric, the upper and lower bounds for the F1 credibility interval [$F1_{lo}$, $F1_{up}$] may be determined from the harmonic means definition of the F1 score and the upper/lower bounds for the credibility interval for the precision and recall as follows:

$$F1_{lo}=HM(p_{lo},r_{lo}) \text{ and } F1_{up}=HM(p_{up},r_{up}).$$

The area under the receiver operator characteristic (ROC) curve is another performance metric that the various embodiments are enabled to statistically estimate and provide a credibility interval for. An ROC curve for a classifier may include a curve (or plot thereof) of the classifier's true positive rate (TPR or recall above) as a function of the classifier's false positive rate (FPR or $f_{pr}$ above). The area under the ROC curve (AUC-ROC) is a performance metric that ranges between [0,1]. A value for the AUC-ROC (and its associated credibility interval) may be may be estimated (or determined) as follows. First, the ROC curve may be generated by calculating the TPR as a function of the FPR via the confusion matrix for the label. The credibility interval may be calculated for each point on the ROC curve, as discussed above. The interval bounds for the curve may be determined as discussed above, e.g., $FPR_{lo}$, $FPR_{up}$, $TPR_{lo}$, and $TPR_{up}$. The lower bound for the ROC curve is: ($FPR_{lo}$, $TPR_{up}$) and the upper bound for the ROC curve is: ($FPR_{up}$, $TPR_{lo}$). The area enclosed by the upper and lower bands of the ROC curves is determined as the difference in the areas under the two curves: e.g., AUC($FPR_{lo}$, $TPR_{up}$)–AUC($FPR_{up}$, $TPR_{lo}$). This expression may be employed to determine the credibility interval for the area under the ROC curve.

Some embodiments may employ the micro-average (e.g., micro-averaging a performance metric across the set of labels) for the precision, recall, and F1 score, as a performance metric. The micro-average of the precision ($\bar{p}$) may be determined as: $\bar{p} \sim \text{Beta}(\Sigma_{l \in L}TP(l)+\lambda, \Sigma_{l \in L}FP(l)+\lambda)$. The micro-average of the recall ($\bar{r}$) may be determined as: $\bar{r} \sim \text{Beta}(\Sigma_{l \in L}TP(l)+\lambda, \Sigma_{l \in L}FN(l)+\lambda)$. The micro-average of the F1 score ($\overline{F1}$) may be determined as: $HM(\bar{p},\bar{r})$, e.g., the harmonic mean of the micro-average precision and the micro-average recall. The bounds for the credibility interval for the micro-averages may be computed, as described above, from the values of $\bar{p}$ and $\bar{r}$, as described above. In still other embodiments, the macro-average (e.g., macro-averaging a performance metric across the set of labels) for the precision, recall, and F1 score, may be employed as a performance metric. The macro-average of the precision ($\bar{P}$) may be determined as: $P=|L|^{-1}\Sigma_{l \in L}P(l)$. The macro-average of the recall ($\bar{R}$) may be determined as: $\bar{R}=|L|^{-1}\Sigma_{l \in L}r(l)$. The macro-average of the F1 score may be defined as the harmonic mean $HM(\bar{P}, \bar{R})$. The bounds for the credibility interval for the macro-averages may be computed, as described above, from the values of $\bar{P}$ and $\bar{R}$, as described above.

In some embodiments, performance metric estimator 122 may determine the value of more than one performance metric for each label. The performance metric estimator 122 may determine a credibility interval for each performance metric for each label. Furthermore, the performance metric estimator 122 may determine more than one credibility interval for each performance metric for each label by contemplating multiple values for the associated confidence value. Thus, the values of the performance metrics may be encoded in a two-dimensional (2D) array or other data structure: e.g., $\theta(l, m)$, where l and m are indices that correspond to a label of the set of labels and a performance metric (e.g., precision, recall, F1 score, AUC-ROC, and the like). A particular credibility interval (e.g., $[r_{lo}, r_{up}]$) may be encoded in a one-dimensional (1D) array or other data structure. The set of credibility intervals may encoded in a three dimensional array (3D) or other data structure, e.g., $\mu(l, m, q)$, where q is an index that indicates the value of the predetermined confidence value for the credibility interval. Similarly, the size of the credibility intervals (e.g., $|r_{up}-r_{lo}|$) may be stored in a 3D array, e.g., $\Delta(l, m, q)$.

In various embodiments, upon determining the credibility interval for each label of the set of possible labels, performance metric estimator 122 may be enabled to identify one or more labels that are violating labels. As a reminder, a violating label is a label, where the size of the credibility interval is larger than a predetermined interval threshold (e.g., $\Delta(l, m, q) \geq \delta$, where $\delta$ is the predetermined interval threshold). In some embodiments, performance metric estimator 122 may subdivide the set of labels into two complementary subsets: a set of violating labels(V) and a set if non-violating labels ($\bar{V}$) (e.g., for particular values of m, q, and $\delta$).

In general, increasing the number of "observations" or "samples" that are employed to determine a statistically estimated quantity (e.g., a point estimate for an underlying distribution of the "observations" or "samples") has the effect of decreasing the size of the confidence or credibility interval (for a fixed confidence value q) To this end, some embodiments are enabled to determine and/or quantify the number of additional datapoints that would be required to transition a violating label to a non-violating label. To determine the number of additional datapoints required to transition a violating label to a non-violating label, dataset amplifier 124 may be enabled to simulate an "amplification" or increase in the number of datapoints that are available for a label. Performance metric estimator 122 may be enabled to map each of the N datapoints in $\hat{D}_l: \{x_i, y_i\}_{i=1}^N$ (for each each of |L| possible labels) as one of the four categories (e.g., bins or "buckets"): true positive, true negative, false positive, or false negative. The number of true positive, true negative, false positive, and false negative datapoints in $\hat{D}_l$ are indicated as: TP, TN, FP, and FN respectively, where TP+TN+FP+FN=N. The probabilities that any single point in the dataset falls into the four categories is: $\pi_{TP}$=TP/N, $$\pi_{TN} = TN/N, \pi_{FP} = \frac{FP}{N},$$

and $\pi_{FN}$=FN/N, where $\pi_{TP}+\pi_{TN}+\pi_{FP}+\pi_{FN}=1$.

Note that the numbers of datapoints in each of the four classifications may be increased uniformly, without changing the various ratios between the four categories. For example, $$TP \to \left(1 + \frac{x}{100}\right) \cdot TP, TN \to \left(1 + \frac{x}{100}\right) \cdot TN,$$

$$FP \to \left(1 + \frac{x}{100}\right) \cdot FP, \text{ and } FN \to \left(1 + \frac{x}{100}\right) \cdot FN,$$

such that $$N \to \left(1 + \frac{x}{100}\right) \cdot N,$$

were x is a scaling factor (or amplification factor) that is greater than zero. Although these uniform increases in the number of datapoints in the dataset do not affect the value of the point estimate, the associated credibility interval is decreased. An updated confusion matrix may be generated to update the credibility intervals, which results in decreased credibility intervals. That is, the components of the confusion matric may be scaled, via the above expressions, as a function of the amplification factor x.

In some embodiments, dataset amplifier 124 may iterate over the scaling factor x. For instance, for each violating label, dataset amplifier 124 may initialize a value of x (e.g., $x \to 1$), and determine an updated credibility interval. If the updated credibility interval continues to render the label as a violating label, the value of x may be incremented (with appropriate granularity) and the process is repeated until either the violating label is transitioned to a non-violating label (or until the value of x reaches a predetermined upper bound). The value of x that results in a transition from violating label to non-violating label provides an indication of how many additional "real" (e.g., not "simulated") datapoints would be required for an adequate reduction in the label's credibility interval.

In some scenarios, the acquisition of additional ground-truth labeled datapoints (for at least some violating labels) may not practical. For such embodiments, label aggregator 126 may be enabled to aggregate (or merge) each of the violating labels with one or more other labels, such that the merged label is a non-violating label. The labels may be aggregated into disjoint groups. By merging violating labels with other (violating and/or non-violating) labels, the number of datapoints associated with each of the violating labels is increased, which results in a reduced credibility interval for the merged label. With a sufficient reduction in a violating label's credibility interval, the violating label is transformed into a non-violating label. The embodiments may iteratively merge labels until each of the labels is a non-violating label.

Thus, once the violating labels have been merged with other labels, the set of labels may include one or more groups of labels. For example Label A may be a violating label that is merged with Label B, where Label B may or may not be a violating label. The merging of Label A and Label B results in another label (e.g., Label C), which includes Label A and Label B. Label C is a group of labels (e.g., Label A and Label B). The set of possible labels may be updated and/or refined to include Label C, whereas Label A and Label B may be removed from the set of possible labels. A group of labels may be denoted by g, and may include a subset of the labels in the original set of possible labels (where the elements of the subset have been removed from the updated set of possible labels).

Classifier updater 128 may be enabled to update and/or refine the classifier, as well as the dataset and the set of labels, in view of the merging of labels. Classifier updater 128 may update the set of labels (e.g., adding Label C to the set of possible labels, while removing Label A and Label B from the set of possible labels). The set of possible labels may be denoted as L (e.g., $l \in L$) and the updated set of possible labels may be denoted as $\hat{L}$. Label l may be a violating label that label aggregator 126 merges with one or more other labels (e.g., l') to generate a group of labels g, where $\{l,l'\} \in g$. Classifier updater 128 may update the set of possible labels to generate $\hat{L}$, where $g \in \hat{L}$ and $l \notin \hat{L}$. Classifier updater 128 may update the classifier such that for any datapoint that the pre-updated classifier (e.g., f) would have predicted label l, the updated classifier (e.g., $\hat{f}$) now predicts label g for the same datapoint. For example, if $f(x) \to l$, then $\hat{f}(x) \to g$. Classifier updater 128 may similarly update the dataset to reflect the merging of labels by updating the ground-truth labels. For instance, for all datapoints that had a ground-truth labeling that include l, the ground-truth labeling will be updated such that the ground-truth labeling now includes g (and may not include l). In the above example, all the data points in the dataset that have ground-truth labels that indicate either Label A or Label B may be re-labeled to include ground-truth labeling that indicates Label C (and not Label A or Label B).

Returning to the functionality of label aggregator 126, label aggregator 126 may merge labels such that the groupings of labels is "coherent." That is, the when searching for a (violating or non-violating) label to merge with a violating label, the embodiments identify labels that are "similar in scope" to that of the violating label, such that there may exist a degree of similarity of "likeness" between the labels that are merged. This degree of similarity between labels may be quantified via a confusion metric that indicates a likelihood (or frequentist probability) that the classifier "confuses" a pair of labels, e.g., a "label-confusability metric" for a pair of labels. In particular, the label aggregator 126 merges labels, where the classifier is likely to confuse the labels within a merged group (e.g., g). In the above example, the classifier may be likely to confuse Label A and Label B. That is, for datapoints with a ground-truth labeling of Label A, the classifier may have a significant likelihood of predicting Label B. Likewise, for datapoints with a ground-truth labeling of Label B, the classifier may have a significant likelihood of predicting Label C. Thus, the label-confusability metric for the pair of labels that includes Label A and Label B is relatively large (e.g., compared with other labels in the set of possible labels). Label A and Label B may be relatively "similar" in that there may be a degree of "closeness" or "similarity" between the datapoints that correspond (e.g., via the ground-truth labels of the predicted labels) to Label A and the datapoints that correspond to Label B (e.g., via the ground-truth labels of the predicted labels). For instance, the datapoints corresponding to Label A may be "close to" the datapoints corresponding Label B in the abstract vector space that is spanned by the datapoints vector representation. Thus, the grouping of label A and label B may be a "coherent" grouping of labels.

The embodiments may avoid unnecessary grouping of labels by merging two labels only if at least one of the labels is a violating label, and then requiring a degree of coherency between the two labels (e.g., requiring a significantly large label-confusion metric for the pair of labels). The labels may be iteratively merged. For example, upon generating Label C by merging Label A and Label B, the credibility interval of Label C may be computed. If Label C is a violating label, then the merging iterations may continue to identify another label to merge with Label C. Otherwise, if Label C is a non-violating label (and each of the other labels is a non-violating label), then the iterations may be terminated. In the above example, if Label C is a violating label, then another label from the updated set of possible labels may be identified to merge with Label C, where the identified label is somewhat "coherent" with Label C. For example, Label X may be identified, where the label-confusability metric for the pair of labels Label C and Label X is relatively large. Label C and Label X may be merged to form Label D, where Label D includes Label A, Label B, and Label X. The classifier, the dataset, and the set of labels may be updated as described above (e.g., Label D may be added to the set of possible labels and Label C may be removed from the set of possible labels).

The label-confusability metric for a pair of labels $(l_1, l_2)$, where $l_1 \in L$ and $L_2 \in L$, may be computed as follows: $C(l_1, l_2) = 1/2 \, (Pr(l_1 \in f(x) | l_2 \in y) + Pr(l_2 \in f(x) | l_1 \in y))$. If there are no datapoints in the dataset where the classifier confuses $l_1$ and $l_2$, then $C(l_1, l_2) = 0$. If the classifier confuses $l_1$ and $l_2$ for every datapoint in the dataset (associated with $l_1$ or $l_2$), then $C(l_1, l_2) = 1$. It is noted that each of the possible $\frac{1}{2} \cdot |L| \cdot (|L|-1)$ label-confusability metrics may be computed directly from the components of the $|L| \times |L|$ "complete" confusion matrix and $C(l_i, l_i) = 1$ by definition. The label-confusability metrics may be encoded in the components of a $|L| \times |L|$ label-confusability matrix. The label-confusability matrix is a symmetric matrix with 1s on its diagonal and should not be confused and/or conflated with either a $|2| \times |2|$ confusion matrix (for a particular label) or the $|L| \times |L|$ complete confusion matrix. To avoid such confusion, a $|2| \times |2|$ confusion matrix or the |L|×|L| complete confusion matrix may be referred to as an "error matrix."

As discussed in conjunction with at least process 200 of FIG. 2, labels are merged by generating a graph data structure (G). The nodes of the graph correspond to the labels of the set of labels. The graph may be employed to determine groups of labels to merge. Thus, the graph G may be referred to as a label-merging graph. The edges of the graph are generated from the label-confusability metrics. A violating label (e.g., l) is connected to another label (e.g., l') via a graph edge, where the label-confusability metric for the label pair (l, l') (e.g., C(l, l')) is greater than any other label-confusability metric for any other label pair that includes l, e.g., C(l, l')≥C(l, m), where m ∈ L and m≠l and m≠l'. The connected components of the graph are identified and indicate groups of labels to merge. The set of connected components of the graph G (and thus the groups of labels to merge) are indicated by: $\{G_1, G_2, G_3, \ldots\}$. As noted, a connected component (or simply a component) of a graph is a subgraph of the graph, where each node in the subgraph is (directly or indirectly) connected to each other node in the subgraph and isolated from (e.g., not directly or indirectly connected to) any other node of the graph that is not included in the subgraph. As labels are merged during the iterations of label merging, connected components emerge in the graph. The label-confusability metric for a pair of connected components $\{G_1, G_2\}$ may be computed as follows:

$$C(G_1, G_2) = \frac{1}{|G_1| \cdot |G_2|} \sum_{g_1 \in G_1} \sum_{g_2 \in G_2} C(g_1, g_2).$$

Note that $C(G_1, G_2)$ may be computed by performing aggregations on the |L|×|L| label-confusability matrix.

FIG. 2 illustrates pseudo-code for an exemplary process 200 for merging labels that is consistent with the various embodiments. Process 200, or portions thereof, may be performed and/or executed by any computing device, such as but not limited to computing devices 108 and 118 of FIG. 1, as well as computing device 600 of FIG. 6. Additionally, a classifier refinement engine, such as but not limited to classifier refinement engine 120 of FIG. 1, may perform and/or execute at least portions of process 200.

During its execution, process 200 calls three procedures for which the pseudo-code is also provided: checkL 220, updateLOM 240 and flatten 260. Process 200 takes five objects as input: dataset ($\mathcal{D}$), a performance metric (m), a confidence value (q), an interval threshold (δ), and a merge threshold (M). A list of labels (e.g., the set of possible labels L) and the classifier (f) may also be considered as inputs to process 200. The output of process 200 includes a data structure encoding a list of groupings of labels to merge (e.g., groups). Process 200 is an iterative process, where at each iteration, at most, Mlabels are merged into a single label. At each iteration, the top violating labels (e.g., as identified by the size of their credibility interval) are merged. Each of the violating labels is connected to the most "similar" label (e.g., as measured by the label-confusability metric for pairs of labels) in an undirected graph (e.g., G). The graph may be a label-merging graph. That is, each violating label is directly connected to the label that the classifier is "most likely to confuse" with the violating label. The connected components of the graph are identified. The labels within a single connected component are merged into an aggregated label. After one or more iterations of process 200, the set of possible labels may include one or more groups of labels (e.g., an aggregated label) and/or one or more individual labels. Process 200 continues until there are no more violating labels.

As noted throughout, the input dataset is a ground-truth labeled dataset: $\mathcal{D} :\{x_i, y_i\}_{i=1}^{N}$, where $x_i \in \mathbb{R}^D$ is the ith datapoint and $y_i \in p^{|L|}$, where p is a probability (e.g., a real number between [0,1]) that the classifier assigns to the corresponding label. Via a probabilistic threshold, the ground-truth labels (e.g., $y_i \in p^{|L|}$) may be converted (or transformed) into deterministic predictions via a probabilistic threshold. That is, the probabilities for the ground-truth labels may be converted into predicted labels (e.g., $y_i \in 2^{|L|}$) via the probabilistic threshold. The input performance metric may be one of more of the following: recall, precision, false-positive rate, F1-score, or the areas under the ROC curve (AU-ROC). The input confidence value (q) is a real number between [0, 1] that corresponds to the confidence percentage of the credibility interval. The input interval threshold (δ) corresponds to the maximum allowable length (or size) of the credibility interval (e.g., δ indicates the boundary between violating and non-violating labels). The input merge threshold (M) indicates the maximum number of labels that are merged in a single iteration of process 200.

At line 1 of process 200, a data structure encoding a list (or set) of violating labels (V), a data structure encoding a list (or set) of non-violating labels ($\overline{V}$), and a data structure encoding a list (or set) of labels to merge (LOM) are initialized as empty lists (e.g., the null set: ∅). At line 2, the label-confusability metric $C(l_1, l_2)$ is computed for each possible pair of labels. These label-confusability metrics may be encoded in a |L|×|L| label-confusability matrix. It should also be noted that the 2×2 confusion matrices (or the |L|×|L| complete confusion matrix), as well as the credibility intervals (e.g., μ(l, m, q)) and/or the size of the credibility intervals (e.g., Δ(l, m, q)) may be encoded in one or more data structures.

Lines 3-4 include a loop over all labels, where the check1 procedure 220 is called during each iteration of the loop with each label as an argument of the procedure 220. During the looped calling the check1 procedure 220, each label is assigned to one (and only one) of the violating label list or the non-violating list, based on the size of the label's credibility label (e.g., Δ(l, m, q) computed as described above) and the interval threshold. Lines 5-6 terminate process 200 and returns the set of labels, in the event that there are no violating labels, e.g., V=∅. Line 7 generates a data structure encoding a list of violating labels (S). S is a subset of V. If |V|≤M, then S=V. Otherwise, S is a proper subset of V that includes the M largest violators (e.g., |S|=M), as measured by Δ(l, m, q). At line 8, a data structure encoding an empty undirected graph (G) is initialized. In initializing G, every label in L may be initially included as a node. Upon generating the edges of the graph, unconnected labels (e.g., an isolated node that is not connected to any other node in G) may be pruned from G.

Lines 9-10 generate the graph by looping over each label (l) included in S. For each label in S (l ∈ L), another label is identified ($\mathcal{N}(l) \in L$) to connect l with, where $\mathcal{N}(l) := \mathrm{argmax}_{l' \in L \setminus \{l\}} C(l', l)$. That is, the label that the classifier is "most likely to confuse" with the violating label is identified, and the violating label is directly connected to the identified label via a graph edge. The edge (l, $\mathcal{N}(l)$) is appended to G. Thus, G is iteratively constructed via the loop of lines 9-10. After the completion of the loop of lines 9-10, each label in S is directly connected to another label (e.g., a violating or a non-violating label) that is its "most likely to confuse with" label. The violating label (l) may be indirectly connected to one or more other labels, via $\mathcal{N}$ (l). In some embodiments, each node of G that is unconnected to another node may be pruned from G.

At line 11 of process 200, the updateLOM procedure 240 is called. The updateLOM procedure 240 updates the LOM data structure (initialized as the null set at line 1) based on connected components of G. At line 2 of updateLOM 240, each of the connected components of G may be identified to generate a set of connected components: $\{G_1, G_2, G_3, \ldots\}$. At line 3 of updateLOM 240, an empty dictionary data structure is initialized, e.g., dict={ }. The dictionary may be a "set of sets," where each set in the dictionary corresponds to one of the connected components of G. Lines 4-10 of updateLOM 240 include nested loops to generate one or more groups of labels (e.g., a grouping for each connected component of G), where the labels (e.g., nodes) of a connected component are to be merged into a single label. The groupings are appended to the LOM data structure. In some embodiments, the dictionary data structure (and thus the LOM data structure) may be a key-value data structure that encodes key-value pairs, e.g., {key, value}. The arbitrary node selected for each connected component (e.g., l in line 5) may be a value and the rest of the labels (e.g., l' in lines 6-7) are the keys corresponding to that value. For example, a first connected component (e.g., $G_1$) may comprise the following subgraph: $G_1$=((A, B), (B, C), (C, D)). If A is the label arbitrarily selected (e.g., l=A at line 5 of the updateLOM procedure 240), then the dictionary entries for the first connected component (e.g., $G_1$) are: $dict_{G_1}$={{B, A}, {C, A}, {D, A}}. In some embodiments, the labels (e.g., nodes) in a particular connected components are merged into an aggregated or grouped label. In this example, the label group: (A, B, C, D) may be merged into a single label. At the completion of the nested loops, the LOM data structure encodes the groupings of labels to merge via these key-value pairs.

Returning to process 200, at line 12 of process 200, the dataset and set of labels are updated based on the labels that are to be merged, as indicated by the updated LOM data structure. That is, the labels are merged as indicated by LOM and the ground-truth labeling of $\mathcal{D}$ is updated based on the merged labels. At line 13, the label-confusability metrics may be updated based on merging the labels. Note that the updating of the label-confusability metrics may be expedited by performing aggregations on the components of the label-confusability matrix. At line 14, the data structure encoding the list of violating labels is updated to "subtract out" or remove each of the violating labels that were included in S. At line 15, the list of non-violating labels is updated to "subtract out" or remove the intersection of G and $\nabla$, e.g., to subtract out each of the non-violating labels that were included in G and that have been merged with one or more violating labels. That is, the non-violating labels that are included in a connected component of G are subtracted from $\nabla$.

Lines 16-17 include a loop over each of the new merged labels. During each iteration of the loop of lines 16-17, the check1 procedure 220 is called for the corresponding new label. If the newly merged label is found to still be a violation of the interval threshold, then the newly merged label is added to the list of violation labels, via the check1 procedure 220. Otherwise, if the newly merged label is non-violating label, it is added to the list of non-violating labels. At line 18 of process 200, a terminating condition is checked. More specifically, if the list of violating labels is the null set, the iterations of process 200 are terminated. When terminating process 200, the flatten procedure 260 is called, to return a "flattened" list of merged labels. Otherwise, if violating labels still exist, process 200 returns to line 7 to continue iteratively merging labels.

Before process 200 terminates, the flatten procedure 260 is called with LOM data structure and the updated L data structure as arguments. At line 2 of flatten 260, an empty graph $\mathcal{G}$ is initialized (upon formation, $\mathcal{G}$ is a "flattened" version of G). Lines 3-6 of flatten 260 include a loop over the dictionary entries in LOM. Lines 4-5 of flatten 260 include a loop over the key-value pairs in each dictionary entry is nested within the loop over the dictionary entries. In the inner loop, the key-value pairs are appended on $\mathcal{G}$ to generate a "flattened" graph of the connected components. In the above example, the "flattened" representation of $G_1$ would be $G_1$=((B, A), (C, A), (D, A)), i.e., every node (except A) in the "flattened" representation of $G_1$ is directly connected to the same node (e.g., A, the arbitrarily selected node of line 5 of updateLOM 240) rather than the indirect connections of the "un-flattened" representations above. Thus, $\mathcal{G}$ includes "flattened" representations of the connected components. The flattened graph may be referred to as a flattened label-merging graph. Lines 7-8 of the flatten procedure 260 include a loop over the labels in the updated L. A tree data structure is constructed in this loop, where each label in L is connected to a "root" node of the tree. The "children" of the root node encode the groupings of the labels to merge. The arbitrarily selected label for each of the groups to merge is connected to the root node, such that the tree includes "subtrees" of groups of labels to merge. Note that some children of the root node may be individual labels that are non-violating labels and were "isolated" in the construction of the original graph. In lines 10-11, a loop is employed to traverse the tree and generate a data structure that encodes a list of groups of labels to merge. At line 12, the data structure encoding the label groups is returned.

Figure 3:
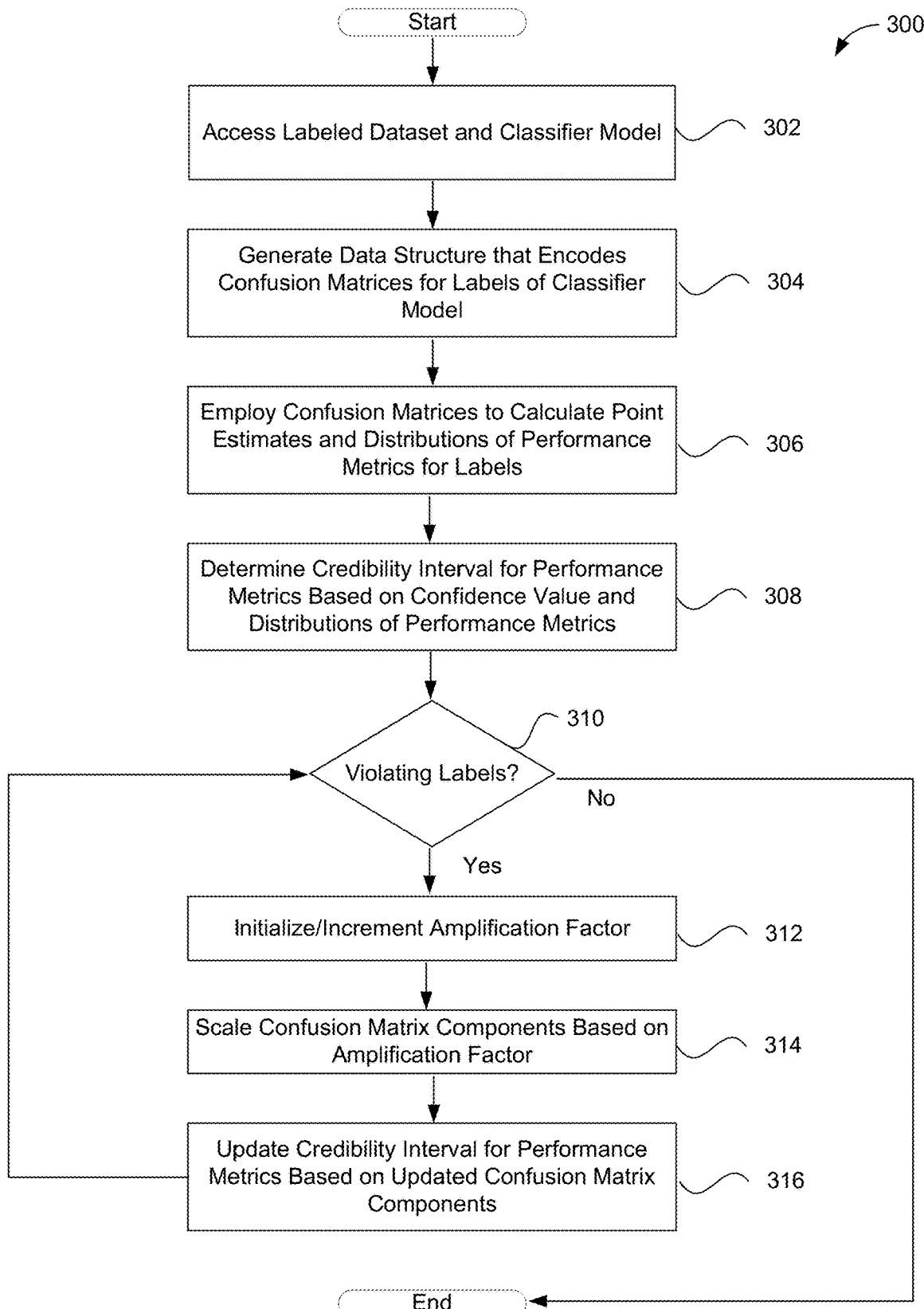
FIG. 3 illustrates one embodiment of a method for quantifying a dataset amplification factor that adequately decreases a credibility interval for the estimation of a performance metric for a label that is consistent with the various embodiments presented herein.
Figure 4:
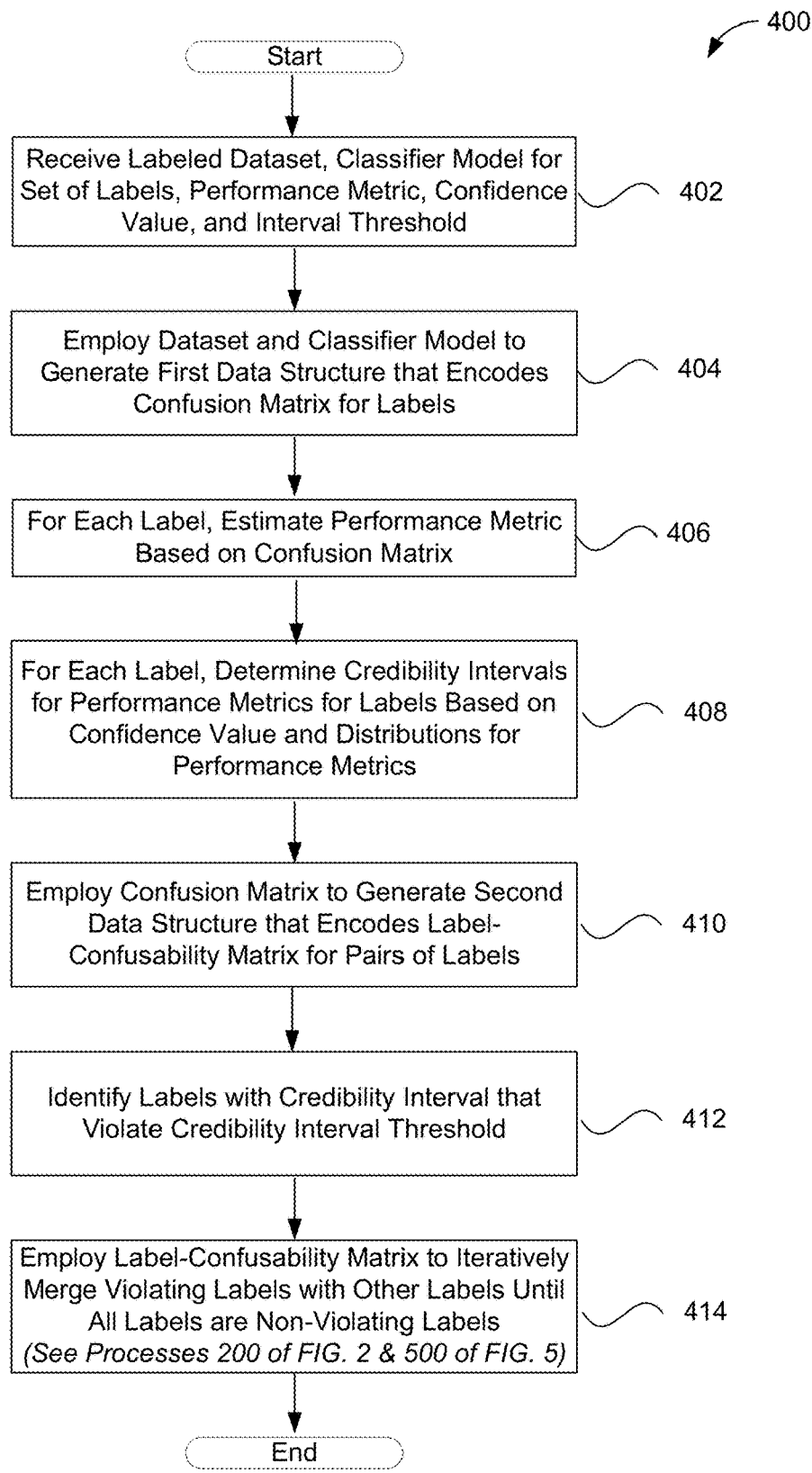
FIG. 4 illustrates one embodiment of a method for quantifying and improving a performance of a classifier that is consistent with the various embodiments presented herein.
Figure 5:
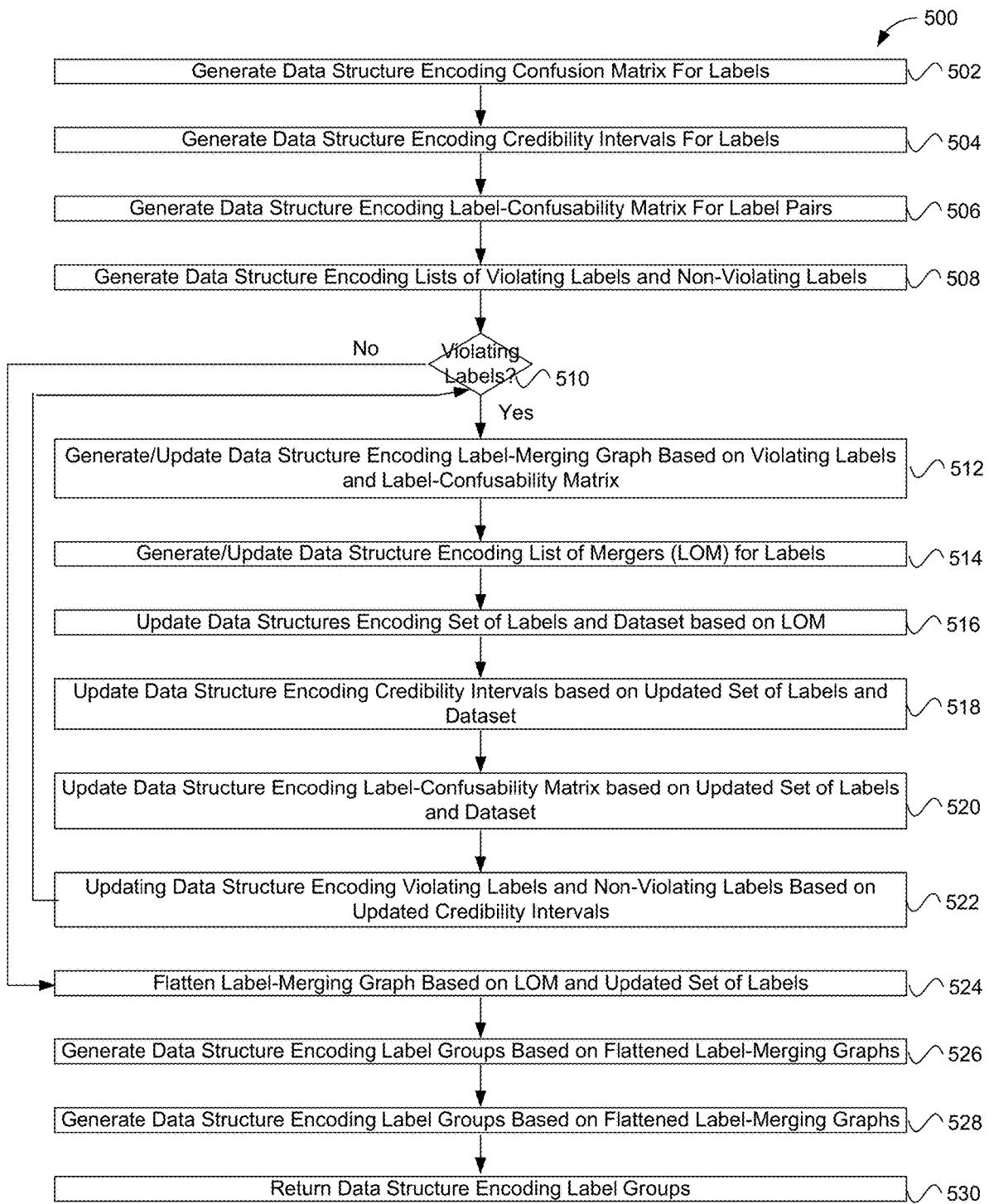
FIG. 5 illustrates one embodiment of a method for merging labels that is consistent with the various embodiments presented herein.
Figure 6:
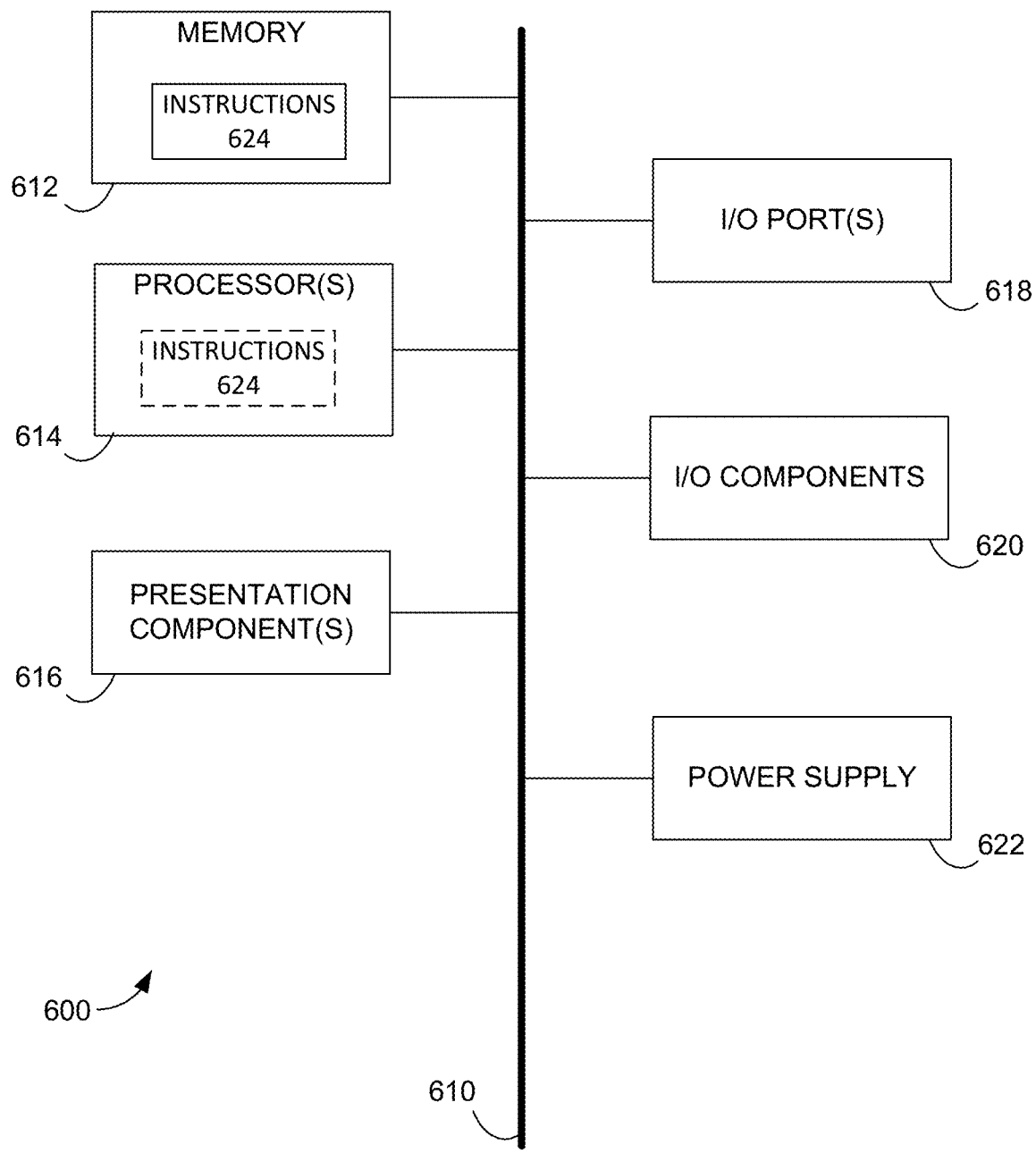
FIG. 6 is a block diagram of an example computing device in which embodiments of the present disclosure may be employed.

Generalized Methods for Quantifying and
Improving the Performance of Classifiers Methods 300-500 of FIGS. 3-5, or portions thereof, may be performed and/or executed by any computing device, such as but not limited to computing devices 108 and 118 of FIG. 1, as well as computing device 600 of FIG. 6. Additionally, a classifier refinement engine, such as but not limited to classifier refinement engine 120 of FIG. 1, may perform and/or execute at least portions of methods 300-500. Additionally, any of methods 300-500 may implement any of process 200 and/or procedures 220, 240, and/or 260 of FIG. 2.

FIG. 3 illustrates one embodiment of method 300 for quantifying a dataset amplification factor that adequately decreasing a credibility interval for the estimation of a performance metric for a label that is consistent with the various embodiments presented herein. Process 300 begins, after a start block, at block 302, where a ground-truth labeled dataset and a classifier model are accessed. The label and classifier are each associated with a set of possible labels. At block 304, a data structure that encodes a confusion matrix for the set of labels for the classifier model is generated. In some embodiments, a separate 2×2 confusion matrix for each of the labels is encoded in one or more data structures. In other embodiments, a single |L|×|L| complete confusion matrix is encoded in a single data structure.

At block 306, the confusion matrices (or the complete confusion matrix) are employed to calculate a point estimate and distribution for one or more performance metrics for each label of the set of labels. Such performance metrics include but are not limited to precision, recall, F1-score, false positive rate, AUC-ROC, and the like. At block 308, a credibility interval of the estimated performance metric is determined for each label. The credibility interval is determined via a confidence value (e.g., q) and the distributions of the performance metric. The credibility intervals may be encoded in a 3D array or other data structure, e.g., µ(l, m, q). Similarly, the size of the credibility intervals (e.g., $|r_{up}-r_{lo}|$) may be stored in a 3D array, e.g., Δ(l, m, q).

At decision block 310, it is determined whether any of the labels are violating labels, e.g., do any of the labels have a credibility interval that is greater than a predetermined interval threshold. If there are no violating labels, the method 300 may terminate at the end block. Otherwise, if there are violating labels, blocks 310 through 316 may form an iterative loop to determine an amplification or scaling factor to "simulate" an increase in the number of datapoints for the violating label to transition to a non-violating label. The amplification factor may be indicated as x. During the first pass through this loop, the amplification factor may be initialized (e.g., x→1) at block 312. For subsequent iterations, at block 312, the amplification factor may be incremented by an appropriate granularity factor (ξ), e.g., x→x+ξ. Although not shown in FIG. 3, process 300 may terminate if the amplification factor reaches a predetermined upper bound (κ) before each of the violating labels is transitioned to a non-violating label, e.g., process 300 may terminate if x≥κ.

At block 314, the components of the confusion matrices may be scaled by the value of the amplification factor, e.g., $$TP \to \left(1 + \frac{x}{100}\right) \cdot TP, \, TN \to \left(1 + \frac{x}{100}\right) \cdot TN,$$
$$FP \to \left(1 + \frac{x}{100}\right) \cdot FP, \text{ and } FN \to \left(1 + \frac{x}{100}\right) \cdot FN,$$

such that $$N \to \left(1 + \frac{x}{100}\right) \cdot N.$$

At block 316, the credibility intervals (e.g., µ(l,m, q)) and/or the size of the credibility intervals (e.g., Δ(l, m, q)) for the performance metrics are updated based on the updated components of the confusion matrices. Process 300 returns to decision block 310 to determine if the "simulation" of the amplification of the dataset has adequately decreases the credibility intervals for the violating labels.

FIG. 4 illustrates one embodiment of a method 400 for quantifying and improving a performance of a classifier that is consistent with the various embodiments presented herein. Process 400 begins, after a start block, at block 402, where a ground-truth labeled dataset, a classifier model for a set of labels, a performance metric, a confidence value, and an interval threshold are received and/or accessed. The dataset may include a set of datapoints that includes at least a first and a second datapoint. A ground-truth label may be assigned to each datapoint of the set of datapoints. The classifier model may be enabled to predict a predicted label for each datapoint of the set of datapoints. The ground-truth label and the predicted label for each datapoint may be included in the set of labels.

At block 404, the dataset and the classifier model are employed to generate a first data structure that encodes a 2×2 confusion matric for each label (or alternatively a |L|×|L| complete confusion matrix which encodes the confusion matrix for each label in a single matrix). As noted throughout, a confusion matrix may be an error matrix. The components of the confusion or error matrices may be computer based on a comparison between the ground-truth label and the predicted label for each datapoint of the set of datapoints. The components of the confusion matrices indicate instances of correct and incorrect label predictions of the classifier model, based on the ground-truth labeling of the datapoints. At block 406, a value of a performance metric may be estimated for each of the labels. The estimation of the performance metric for a particular label may be based on the confusion matrix for the particular label.

At block 408, credibility intervals (or credibility ranges) are calculated for the performance metric for each label. The calculation of the credibility intervals is based on the confidence value, the value for the performance metric, and the confusion matrices for the labels. At block 410, the confusion or error matrices are employed to generate a second data structure that encodes a |L|×|L| label-confusability matrix. The components of the label-confusability matrix represent the label-confusability metrics for each pair of labels. More specifically, the components of the label-confusability metric indicate instances of incorrect label prediction of the classifier model for the labels of the corresponding pair of labels. A label confusability metric for a particular pair of labels indicates a likelihood that, when predicting a predicted label for a datapoint, the classifier "confuses" the two labels of the pair of labels. Note that one of, or both of, the labels in a pair of labels may be a group of labels (e.g., labels that have been previously merged).

At block 412, one or more labels of the set of labels may be identified that have credibility interval, e.g., the absolute distance between the upper bound and the lower bound of the label's credibility interval (for the particular performance metric and for the particular value of the confidence value) that is greater than or equal to the particular value of the interval threshold. For example, a first label of the set of labels may be identified, where the credibility interval (or credibility range) for the performance metric is greater than the interval threshold. The first label may be a violating label because the size of its credibility label violates the interval threshold. It should be noted that one or more additional labels of the set of violating labels may also be violating labels because the size of their credibility intervals also violate the credibility interval. The classifier model may predict the first label as the predicted label for the first datapoint of the set of datapoints.

In some embodiments, one or more data structures may be generated to encode a list of the violating labels and a list of non-violating labels. The list of violating labels may include a first subset of the labels and the list of non-violating labels may include a second subset of labels that is a complement to the first subset that includes violating labels. In the above example, the first label would be included in the first subset. Furthermore, each of the labels included in the first subset of labels has a credibility interval, for the performance metric, with a size that is larger than the particular value of the interval threshold. As discussed in conjunction with at least process 200 of FIG. 2, a data structure may be generated that encodes a graph (e.g., a label-merging graph G). The graph includes a set of nodes and a set of edges. Each node corresponds to a labels of a second subset of the set of labels. The first subset of labels is a subset of the second subset of labels, and thus includes the first label. The graph may be employed to identify one or more other violating labels (and/or non-violating labels) to merge with the violating labels of the first subset of labels, At block 414, the label-confusability matrix may be employed to iteratively merge each of the violating labels with one or more other (violating or non-violating labels) labels until all the labels of the set of violating labels are non-violating labels. Various embodiments for merging violating labels with other labels are discussed in conjunction with at least process 200 of FIG. 2 and method 500 of FIG. 5. However, briefly here, one or more other labels of the set of labels may be identified to merge with the first label. For instance, at least a second label of the set of label may be identified at block 414. The identification may be based on the label-confusability metric for the pair of labels that includes the first label (which is a violating label) and the second label (which may or may not be a violating label). The label-confusability metric for this pair indicates incorrect label predictions of the classifier model for the first label and the second label, e.g., the label-confusability metric indicates a likelihood that the classifier "confuses" the first and second labels.

A classifier may be said to confuse a first and second label of a pair of labels when the classifier predicts the second label as the predicted label for one or more datapoints with a ground-truth label corresponding to the first label and/or the classifier predicts the first label as the predicted label for one or more datapoints with a ground-truth label corresponding to the second label. The classifier's tendency to "confuse" the first and second label may be quantified as a probability to mis-predict (based on the ground-truth labeling of relevant datapoints) the first label for the second label (and vice versa). The probability of mis-predicting the first label for the second label and the probability of mis-predicting the second label for the first label is indicated by the label-confusability metric for the label pair that includes the first and second labels.

In some embodiments, the label-confusability metric for the label pair that includes the first and second labels may be greater than the label-confusability metric for any other pair of labels that includes the first label. The classifier model may predict the second label for the second datapoint of the set of datapoints. The assigned ground-truth label of the second datapoint may be the first label. In at least one embodiment, the assigned ground-truth label of the first datapoint may be the second label, e.g., the classifier model is likely to confuse the first and second labels.

As noted above, a label-merging graph (e.g., G) may be employed to identify the second label. For instance, the first and second labels may correspond to a first and a second node of the graph, e.g., the first and second labels are included in the subset of the labels that correspond to nodes of the graph. More specifically, in response to determining that the label-confusability metric for the pair of labels that includes the first and second labels is greater than the label-confusability metrics for any other possible pair of labels that includes the first label, an edge between the nodes corresponding to the first and second labels may be generated. A set of connected components of the graph is identified. Because the nodes corresponding to the first and second labels are connected via an edge of the set of edges of the graph, the nodes corresponding to the first and second labels are in the same connected component of the graph (e.g., a first connected component of the set of connected components). In response to determining that nodes corresponding to the first and second labels are included in the first connected component, the second label is identified as a label to aggregate or merge with the first label.

In some embodiments, a data structure may be generated to encode a flattened version of the graph (e.g., $\mathcal{G}$). The flattened version of the graph includes flattened representations of each of the connected components of the set of connected components. In a flattened representation of the first connected component, a single node of the first connected component is directly connected via an edge to each of the other nodes of the first connected component. Each of the other nodes of the first connected component is directly connected only to the single node of the first connected component. The flattened version of the graph may be employed to generate a data structure that encodes a data tree. The data tree may include a root node and a plurality of leaf nodes that each correspond to one of the labels of the set of labels, as well as a plurality of sub-trees. A first sub-tree of the plurality of sub-trees may include a first leaf-node of the plurality of leaf nodes that corresponds to the first label, as well as a second leaf-node of the plurality of least nodes that corresponds to the second label. In response to detecting that each of the first leaf-node and the second-leaf node are included in the first sub-tree, the second label may be identified as a label to aggregate with the first label when creating the third label.

As noted above, the merging and/or aggregation of the first and second labels may from and/or create a third label which includes the aggregation (or merging) of the first and second labels. The set of labels may be updated to include the third label. In some embodiments, the updated set of labels may exclude each of the first and second labels. The ground-truth assignments of the datapoints may be updated in the updated set of labels. For example, the ground-truth assignments of the first and second datapoints may be updated, such that the third label is assigned as a ground-truth label for each of the first and second datapoints. At block 414, the classifier model may be updated based on the third label. More specifically, the label predictions for the merged labels may be updated in the classifier model. The updated classifier may predict the third label for each of the first and second datapoints. As a reminder, prior to updating, the classifier model predicted the first label for the first datapoint and the second label for the second datapoint.

Also in various embodiments, the components of the confusion (or error) matrix may be updated based on the updated label predictions of the classifier model and/or the updated ground-truth assignments of the set of datapoints. A credibility interval (or range) may be calculated or determined at block 414. The third label may or may not be a violating label, based on the size of the credibility interval and the interval threshold. For instance, the credibility interval for the third label may be greater than or less than the interval threshold. If the third label is a violating label, then iterative merging of labels may continue until no violating labels exist in the updated set of labels. For example, in response to determining that a credibility range of the third label for the performance metric is greater than the predetermined interval threshold, method 400 may identify a fourth label of the set of labels that the classifier model is likely to confuse with the third label. The identification of the fourth label may be based on instances of incorrect label predictions of the updated classifier model for the third label, a fourth label of the set of labels that the classifier model is likely to confuse with the third label. A fifth label may be generated. The fifth label includes the third label (which includes the first and second labels) and the fourth label. The updated dataset and the updated classifier may be re-updated based on the generation of the fifth label (and the deallocation of the third label).

FIG. 5 illustrates one embodiment of a method 500 for merging labels that is consistent with the various embodiments presented herein. Details of various embodiments of method 500 are discussed at least in conjunction with process 200 of FIG. 2 and methods 300 and 400 of FIGS. 3 and 4 respectively. Process 500 begins, after a start block, at block 502, where a data structure encoding one or more confusion (or error) matrices for the labels are generated. At block 504, a data structure encoding the credibility intervals for a performance metric for the labels are generated. At block 506, a data structure encoding a label-confusability matrix for each possible pair of labels is generated. At block 508, one or more data structures are generated that encode a list of violating labels and a list of non-violating labels. For instance, the data structure encoding the list of violating labels may indicate a first subset of the set of labels that includes at least a first violating label of the set of labels. Each of the labels in the subset of labels may have a credibility interval, for a performance metric that is greater than the predetermined interval threshold. At decision block 510, it is checked whether the list of violating labels is the null set. If there are no violating labels, method 500 flows to block 524. Otherwise, if there are one or more labels included in the list of violating labels, process 500 flows to block 512. Note that blocks 510-522 form an iterative loop for merging labels.

During the loop's initial execution of block 512, a data structure encoding a label-merging graph (e.g., G). During subsequent executions of block 512, the data structure encoding the graph may be updated. The graph may include a set of nodes and a set of edges. Each node in the set of nodes may correspond to a label included in a second subset of labels (which includes the first subset of label, e.g., the set of violating labels). The graph may be employed to identify one or more labels (from the second subset of labels) to connect via an edge to the labels in the first subset of labels. During the initial execution of block 514, a data structure encoding a list of labels to merge (e.g., LOM) is generated. Similar to block 512, during subsequent executions of block 512, the data structure encoding the LOM may be updated. At block 516, a data structure encoding the set of labels may be updated based on the content of the LOM data structure. At block 518, the data structure encoding the credibility intervals may be updated based on the updated set of labels and the dataset. At block 520, the data structure encoding the label-confusability matrix may be updated based on the updated set of labels and the updated dataset, At block 522, the one or more data structures encoding the list of violating labels and the list of non-violating labels are updated based on the updated credibility intervals. Process 500 may then return to decision block 510.

At block 524, the label-merging graph is "flattened" based on the LOM and the updated set of labels. At block 526, a data structure encoding labels groups is generated based on the "flattened" label-merging graph (e.g, $\mathcal{G}$ ). At block 528, a data structure encoding labels groups (e.g., a listing of labels to merge or aggregate) is generated based on the flattened label-merging graph. At block 530, the data structure encoding the labels groups may be returned.

Illustrative Computing Device

Having described embodiments of the present invention, an example operating environment in which embodiments of the present invention may be implemented is described below in order to provide a general context for various aspects of the present invention. Referring to FIG. 6, an illustrative operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 6 is merely illustrative of an example computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. Memory 612 may be non-transitory memory. As depicted, memory 612 includes instructions 624. Instructions 624, when executed by processor(s) 614 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 600 includes one or more processors that read data from various entities such as memory 612 or I/O components 620. Presentation component(s) 616 present data indications to a user or other device. Illustrative presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

The technology described herein is directed towards enhanced methods and systems for quantifying and improving the performance of computation-based classifiers (e.g., a classifier model). One exemplary, but non-limiting, embodiment of a method for updating a classifier model for a set of labels includes accessing a set of datapoints that includes a first datapoint and a second datapoint. A ground-truth label may be assigned to each datapoint of the set of datapoints. The classifier model is enabled to predict a predicted label for each datapoint. The ground-truth label and the predicted label for each datapoint is included in the set of labels. A first data structure that encodes an error matrix (e.g., a confusion matrix) may be generated based on a comparison between the ground-truth label and the predicted label for each datapoint. Components of the error matrix may indicate instances of correct and incorrect label predictions of the classifier model. For each label of the set of labels, a credibility interval may be determined. The credibility intervals are associated with a performance metric and may be based on a predetermined confidence value and the error matrix. A first label of the set of labels with a credibility interval for the performance metric being greater than a predetermined interval threshold may be identified. The classifier model may predict the first label for the first datapoint. A second label of the set of labels that the classifier model is likely to confuse with the first label may be identified. The identification of the second label may be based on instances of incorrect label predictions of the classifier model for the first label and/or the second label. The classifier model may predict the second label for the second datapoint. In some embodiments, the classifier model may be updated based on a third label that includes an aggregation of the first label and the second label. The updated classifier model may predict the third label for each of the first datapoint and the second datapoint. In various embodiments, the set of labels may be updated to include the third label and to exclude each of the first label and the second label. Updating the set of labels may include updating ground-truth assignments of the set of datapoints based on the updated set of labels.

In various embodiments, updating the classifier model may include updating label predictions of the classifier model based on the updated set of labels. The components of the error matrix may be updated based on the updated label predictions of the classifier model and the updated ground-truth assignments of the set of datapoints. A credibility interval of the third label may be determined based on the updated components of the error matrix. The determined credibility interval of the third label for the performance metric may be less than the predetermined interval threshold.

In some embodiments, a second data structure that encodes a label-confusability matrix may be generated. The components of the label-confusability matrix represent a label-confusability metric for each pair of labels of the set of labels. A label-confusability metric for a pair of labels is based on the error matrix and indicates a likelihood that, when predicting a predicted label for a datapoint, the classifier model confuses labels of the pair of labels. The error-confusability of the second data structure may be employed to identify the second label of the set of labels. A first label-confusability metric for a first pair of labels that includes the first label and the second label may be greater than label-confusability metrics for any other pair of labels that includes the first label.

In at least one embodiment, a third data structure that encodes an indication of a first subset of the set of labels is generated. The first subset of labels may include the first label. The credibility interval, for the performance metric, of each label included in the first subset of labels is greater than the predetermined interval threshold. A fourth data structure that encodes a graph may be generated. The graph may be a label-merging graph and includes a set of nodes and a set of edges. Each node of the set of nodes corresponds to a label of a second subset of the set of labels. The second subset of labels includes the first subset of labels and the second label. A first node of the set of nodes corresponds to the first label. A second node of the set of nodes corresponds to the second label. A first edge of the set of edges connects the first node to the second node. The graph may be employed to identify the second label.

In response to determining that a first label-confusability metric for the first pair of labels is greater than the label-confusability metrics for any other pair of labels that includes the first label, the first edge that connects the first node and the second node may be generated. A set of connected components of the graph may be identified. Based on the first edge connecting the first node and the second node, the first node and the second node are each included in a first connected component of the set of connected components. In response to determining that the first node and the second node are each included in the first connected component, the second label may be identified as a label to aggregate with the first label when creating the third label.

In some embodiments, a fifth data structure that encodes a flattened version of the graph is generated. The flattened version of the graph includes flattened representations of each of the connected components of the set of connected components. In a flattened representation of the first connected component, a single node of the first connected component is directly connected via an edge to each of the other nodes of the first connected component. Each of the other nodes of the first connected component is directly connected only to the single node of the first connected component. The flattened version of the graph may be employed to generate a sixth data structure. The sixth data structure encodes a data tree. The data tree includes a plurality of leaf nodes that each correspond to one of the labels of the set of labels. The data trees may additionally include a plurality of sub-trees. A first sub-tree of the plurality of sub-trees includes a first leaf-node of the plurality of leaf nodes that corresponds to the first label. The first sub-tree may additional include a second leaf-node of the plurality of leaf nodes that corresponds to the second label. In response to detecting that each of the first leaf-node and the second-leaf node are included in the first sub-tree, the second label may be identified as a label to aggregate with the first label when creating the third label.

In response to determining that the size of the credibility interval of the third label for the performance metric is greater than the predetermined interval threshold, identifying, and based on instances of incorrect label predictions of the updated classifier model for the third label, a fourth label of the set of labels that the classifier model is likely to confuse with the third label may be identified. The updated classifier model may be re-updated based on a fifth label that includes an aggregation of the third label and the fourth label.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

As used herein, the term "set" may be employed to refer to an ordered (i.e., sequential) or an unordered (i.e., non-sequential) collection of objects (or elements), such as but not limited to datapoints, labels, and the like. A set may include N elements, where N is any non-negative integer. That is, a set may include 0, 1, 2, 3, . . . N objects and/or elements, where N is a positive integer with no upper bound. Therefore, as used herein, a set may be a null set (i.e., an empty set), that includes no elements. A set may include only a single element. In other embodiments, a set may include a number of elements that is significantly greater than one, two, or three elements. A set may be an infinite set or a finite set. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B.

As used herein, a datapoint (x) may refer to an element in a set and/or domain. A datapoint may be a quanta of data or information included in a set of datapoints. The data set may be a set of datapoints in a multi-dimensional vector space, e.g., $\mathbb{R}^d$, where d is the dimensionality of the datapoints in the set or domain. In some embodiments, a datapoint may refer to the quanta of data that a classifier receives as input. As used herein, the terms "label" and "class" may be used interchangeably to refer to an indication of a classification of a datapoint. As discussed below, a label (or class) may be a "ground-truth" label (or class) or a "predicted" label. A "ground-truth" label may be interpreted as the "true" classification of a datapoint, whereas a "predicted" label may be interpreted as a "hypothesis" and/or a "prediction" of the datapoint's classifications. For example, a "classifier" may generate a "prediction" for datapoint's classification. For any given datapoint, the datapoint's ground-truth and predicted labels may or may not be equivalent.

A dataset ($\mathcal{D}$) may include a set of datapoints, where one or more labels from a set of possible labels is assigned to each datapoint as a ground-truth label. The set of possible labels may be indicated by L and the cardinality of the set of labels may be indicated as |L|. Some embodiments may be multi-label embodiments, where any of the $2^{|L|}$ possible subsets of the set of labels is assigned to a datapoint as the datapoint's ground-truth label, e.g., more than one label of the set of labels may be assigned to a datapoint as its ground-truth label. The set of all possible subsets of the set of labels (L) may be notated as L', where the cardinality of L' is $|L'|=2^{|L|}$. Similar to Gödel numbering, a one-to-one mapping between the set of possible subset of labels (e.g., L') and the set of positive integers ranging from 1 to $2^{|L|}$. Thus, a dataset that includes N datapoints (e.g., d dimensional datapoints) may be notated as $\mathcal{D}:\{x_i, y_i\}_{i=1}^N$, where $x_i \in \mathbb{R}^D$ is the ith datapoint and $y_i \in 2^{|L|}$ is an integer corresponding ground-truth label, via the numbering of L'.

It is understood that data objects, such as but not limited to scalars, vectors, matrices, tensors, sets, lists, groups, datapoints, arrays, directed or undirected graphs, and the like may be encoded in structured data. That is, any of the various data objects discussed throughout may be encoded in one or more data structures."

What is claimed is:

1. A method comprising:
   accessing a set of datapoints, wherein a ground-truth label is assigned to each datapoint of the set of datapoints, a computation-based classifier model comprising a set of labels predicts a predicted label for each datapoint, and the ground-truth label and the predicted label for each datapoint is included in the set of labels;
   selecting, for each label of the set of labels, a subset of the set of datapoints wherein the subset of the set of datapoints is randomly selected from datapoints associated with a corresponding label;
   determining, for each label of the set of labels, a credibility interval using the randomly selected subset of the set of datapoints wherein the credibility interval is determined based on instances of correct and incorrect label predictions of the computation-based classifier model for the label using the randomly selected subset of the set of datapoints;
   identifying a first label of the set of labels with a first credibility interval for a performance metric of the first label being greater than a predetermined interval threshold;
   identifying a second label of the set of labels, based on instances of incorrect label predictions of the computation-based classifier model for each of the first label and the second label, wherein the instances of incorrect label predictions of the computation-based classifier model for each of the first label and the second label indicate that, when predicting labels for the set of datapoints, the computation-based classifier model is likely to confuse the first label with the second label; and
   updating the computation-based classifier model based on a third label that includes an aggregation of the first label and the second label.

2. The method of claim 1, wherein the set of datapoints includes a first datapoint and a second datapoint, the computation-based classifier model predicts the first label for the first datapoint, the computation-based classifier model predicts the second label for the second datapoint, and the updated computation-based classifier model predicts the third label for each of the first datapoint and the second datapoint.

3. The method of claim 1, further comprising:
   updating the set of labels to include the third label and to exclude each of the first label and the second label; and
   updating that computation-based classifier model includes:
   updating label predictions of the computation-based classifier model based on the updated set of labels;
   updating ground-truth assignments of the set of datapoints based on the updated set of labels; and
   updating components of an error matrix based on the updated label predictions of the computation-based classifier model and the updated ground-truth assignments of the set of datapoints; and
   determining a credibility interval of the third label based on the updated components of the error matrix, wherein the determined credibility interval of the third label for the performance metric is less than the predetermined interval threshold.

4. The method of claim 1, further comprising:
   generating a third data structure that encodes an error matrix based on a comparison between the ground-truth label and the predicted label for each datapoint of the set of datapoints, wherein components of the error matrix indicate instances of correct and incorrect label predictions of the computation-based classifier model; and
   for each label of the set of labels, determining the credibility interval, which is associated with the performance metric, based on a predetermined confidence value and the components of the error matrix.

5. The method of claim 4, further comprising:
   generating a fourth data structure that encodes a label-confusability matrix with components representing a label-confusability metric for each pair of labels of the set of labels, wherein a label-confusability metric for the pair of labels is based on the error matrix and indicates a likelihood that, when predicting a predicted label for a datapoint, the computation-based classifier model confuses labels of the pair of labels; and
   employing the fourth data structure to identify the second label of the set of labels, wherein a first label-confusability metric for a first pair of labels that includes the first label and the second label is greater than label-confusability metrics for any other pair of labels that includes the first label.

6. The method of claim 5, further comprising:
   generating a third data structure that encodes an indication of a first subset of the set of labels, wherein the first subset of labels includes the first label and the credibility interval, for the performance metric, of each label included in the first subset of labels is greater than the predetermined interval threshold;
   generating a fourth data structure that encodes a graph that includes a set of nodes and a set of edges, wherein each node of the set of nodes corresponds to a label of a second subset of the set of labels, the second subset of labels includes the first subset of labels and the second label, a first node of the set of nodes corresponds to the first label, a second node of the set of nodes corresponds to the second label, and a first edge of the set of edges connects the first node to the second node; and
   employing the graph to identify the second label.

7. The method of claim 6, further comprising:
in response to determining that a first label-confusability metric for the first pair of labels is greater than the label-confusability metrics for the any other pair of labels that includes the first label, generating the first edge that connects the first node and the second node;
identifying a set of connected components of the graph, wherein based on the first edge connecting the first node and the second node, the first node and the second node are each included in a first connected component of the set of connected components; and
in response to determining that the first node and the second node are each included in the first connected component, identifying the second label as a label to aggregate with the first label when creating the third label.

8. The method of claim 7, further comprising:
generating a fifth data structure that encodes a flattened version of the graph, wherein the flattened version of the graph includes flattened representations of each of the connected components of the set of connected components such that in a flattened representation of the first connected component, a single node of the first connected component is directly connected via an edge to each of other nodes of the first connected component and each of the other nodes of the first connected component is directly connected only to the single node of the first connected component;
employing the flattened version of the graph to generate a sixth data structure that encodes a data tree that includes a plurality of leaf nodes that each correspond to one of the labels of the set of labels and a plurality of sub-trees, wherein a first sub-tree of the plurality of sub-trees includes a first leaf-node of the plurality of leaf nodes that corresponds to the first label and a second leaf-node of the plurality of leaf nodes that corresponds to the second label; and
in response to detecting that each of the first leaf-node and the second-leaf node are included in the first sub-tree, identifying the second label as a label to aggregate with the first label when creating the third label.

9. The method of claim 7, further comprising:
in response to determining that a credibility interval of the third label for the performance metric is greater than the predetermined interval threshold, identifying, based on instances of incorrect label predictions of the updated computation-based classifier model for the third label, a fourth label of the set of labels that the computation-based classifier model is likely to confuse with the third label; and
re-updating the updated computation-based classifier model based on a fifth label that includes an aggregation of the third label and the fourth label.

10. The method of claim 1, wherein the performance metric includes at least one of a precision, a recall, an F1 score, a false positive rate, a false negative rate, or an area under a receiver operator characteristics (ROC) curve.

11. A non-transitory computer-readable storage medium having instructions stored thereon which, when executed by a processor device, cause performance of actions comprising:
accessing a set of datapoints that includes a first datapoint and a second datapoint, wherein a ground-truth label is assigned to each datapoint of the set of datapoints, a computation-based classifier model comprising a set of labels predicts a predicted label for each datapoint, and the ground-truth label and the predicted label for each datapoint is included in the set of labels;
selecting, for each label of the set of labels, a subset of the set of datapoints wherein the subset of the set of datapoints is randomly selected from datapoints associated with a corresponding label;
generating a first data structure that encodes an error matrix based on a comparison between the ground-truth label and the predicted label for each datapoint using the randomly selected subset of the set of datapoint, wherein components of the error matrix indicate instances of correct and incorrect label predictions of the computation-based classifier model;
determining, for each label of the set of labels, a credibility interval using the randomly selected subset of the set of datapoints wherein the credibility interval is associated with a performance metric of the label, based on a predetermined confidence value and the error matrix using the randomly selected subset of the set of datapoints;
identifying a first label of the set of labels with a credibility interval for the performance metric of the first label being greater than a predetermined interval threshold;
identifying, based on instances of incorrect label predictions of the computation-based classifier model for the first label, a second label of the set of labels that the computation-based classifier model is likely to confuse with the first label, wherein the computation-based classifier model predicts the second label for the second datapoint; and
updating the computation-based classifier model based on a third label that includes an aggregation of the first label and the second label, wherein the updated computation-based classifier model predicts the third label for each of the first datapoint and the second datapoint.

12. The computer-readable storage medium of claim 11, the actions further comprising:
updating the set of labels to include the third label and to exclude each of the first label and the second label; and
updating that computation-based classifier model includes:
updating label predictions of the computation-based classifier model based on the updated set of labels;
updating ground-truth assignments of the set of datapoints based on the updated set of labels; and
updating the components of the error matrix based on the updated label predictions of the computation-based classifier model and the updated ground-truth assignments of the set of datapoints; and
determining the credibility interval of the third label based on the updated components of the error matrix, wherein the determined credibility interval of the third label for the performance metric is less than the predetermined interval threshold.

13. The computer-readable storage medium of claim 11, the actions further comprising:
generating a second data structure that encodes a label-confusability matrix with components representing a label-confusability metric for each pair of labels of the set of labels, wherein a label-confusability metric for the pair of labels is based on the error matrix and indicates a likelihood that, when predicting a predicted label for a datapoint, the computation-based classifier model confuses labels of the pair of labels; and
employing the second data structure to identify the second label of the set of labels, wherein a first label-confusability metric for a first pair of labels that includes the first label and the second label is greater than label-confusability metrics for any other pair of labels that includes the first label.

14. The computer-readable storage medium of claim 13, the actions further comprising:
generating a third data structure that encodes an indication of a first subset of the set of labels, wherein the first subset of labels includes the first label and the credibility interval, for the performance metric, of each label included in the first subset of labels is greater than the predetermined interval threshold;
generating a fourth data structure that encodes a graph that includes a set of nodes and a set of edges, wherein each node of the set of nodes corresponds to a label of a second subset of the set of labels, the second subset of labels includes the first subset of labels and the second label, a first node of the set of nodes corresponds to the first label, a second node of the set of nodes corresponds to the second label, and a first edge of the set of edges connects the first node to the second node; and
employing the graph to identify the second label.

15. The one or more computer-readable storage media of claim 13, the actions further comprising:
in response to determining that a first label-confusability metric for the first pair of labels is greater than the label-confusability metrics for any other pair of labels that includes the first label, generating the first edge that connects the first node and the second node;
identifying a set of connected components of the graph, wherein based on the first edge connecting the first node and the second node, the first node and the second node are each included in a first connected component of the set of connected components; and
in response to determining that the first node and the second node are each included in the first connected component, identifying the second label as a label to aggregate with the first label when creating the third label.

16. The one or more computer-readable storage media of claim 15, the actions further comprising:
generating a fifth data structure that encodes a flattened version of the graph, wherein the flattened version of the graph includes flattened representations of each of the connected components of the set of connected components such that in a flattened representation of the first connected component, a single node of the first connected component is directly connected via an edge to each of the other nodes of the first connected component and each of other nodes of the first connected component is directly connected only to the single node of the first connected component;
employing the flattened version of the graph to generate a sixth data structure that encodes a data tree that includes a plurality of leaf nodes that each correspond to one of the label of the set of labels and a plurality of sub-trees, wherein a first sub-tree of the plurality of sub-trees includes a first leaf-node of the plurality of leaf nodes that corresponds to the first label and a second leaf-node that corresponds to the second label; and
in response to detecting that each of the first leaf-node and the second-leaf node are included in the first sub-tree, identifying the second label as a label to aggregate with the first label when creating the third label.

17. The one or more computer-readable storage media of claim 15, the actions further comprising:
in response to determining that a credibility interval of the third label for the performance metric is greater than the predetermined interval threshold, identifying, based on instances of incorrect label predictions of the updated computation-based classifier model for the third label, a fourth label of the set of labels that the computation-based classifier model is likely to confuse with the third label;
re-updating the updated computation-based classifier model based on a fifth label that includes an aggregation of the third label and the fourth label.

18. A computing system comprising:
a processor device; and
a computer-readable storage medium, coupled with the processor device, having instructions stored thereon which, when executed by the processor device, perform actions comprising:
accessing a set of datapoints that includes a first datapoint and a second datapoint, wherein a ground-truth label is assigned to each datapoint of the set of datapoints, a computation-based classifier model comprising a set of labels predicts a predicted label for each datapoint, and the ground-truth label and the predicted label for each datapoint is included in the set of labels;
selecting, for each label of the set of labels, a subset of the set of datapoints wherein the subset of the set of datapoints is randomly selected from datapoints associated with a corresponding label;
determining, for each label of the set of labels, a credibility interval using the randomly selected subset of the set of datapoints wherein the credibility interval is determined based on comparisons between the ground-truth label and the predicted label for each datapoint of the set of datapoints;
identifying a first label of the set of labels with a credibility interval for the performance metric of the first label being greater than a predetermined interval threshold;
identifying, based on instances of incorrect label predictions of the computation-based classifier model for the first label, a second label of the set of labels that the computation-based classifier model is likely to confuse with the first label; and
updating the computation-based classifier model based on a third label that includes an aggregation of the first label and the second label.

19. The computing system of claim 18, wherein the actions further comprise:
updating the set of labels to include the third label and to exclude each of the first label and the second label; and
updating that computation-based classifier model includes:
updating label predictions of the computation-based classifier model based on the updated set of labels;
updating ground-truth assignments of the set of datapoints based on the updated set of labels; and
updating the comparisons between the ground-truth label and the predicted label for each datapoint of the set of datapoints based on the updated label predictions of the computation-based classifier model and the updated ground-truth assignments of the set of datapoints; and
determining the credibility interval of the third label based on the updated comparisons, wherein the determined credibility interval of the third label for the performance metric is less than the predetermined interval threshold.

20. The computing system of claim 18, wherein the set of datapoints includes a first datapoint and a second datapoint, the computation-based classifier model predicts the first label for the first datapoint, the computation-based classifier model predicts the second label for the second datapoint, the updated computation-based classifier model predicts the third label for each of the first datapoint and the second datapoint, and the actions further comprise:

generating a first data structure that encodes an error matrix based on the comparisons between the ground-truth label and the predicted label for each datapoint, wherein components of the error matrix indicate instances of correct and incorrect label predictions of the computation-based classifier model;

generating a second data structure that encodes a label-confusability matrix with components representing a label-confusability metric for each pair of labels of the set of labels, wherein a label-confusability metric for the pair of labels is based on the error matrix and indicates a likelihood that, when predicting a predicted label for a datapoint, the computation-based classifier model confuses labels of the pair of labels; and employing the second data structure to identify the second label of the set of labels, wherein a first label-confusability metric for a first pair of labels that includes the first label and the second label is greater than label-confusability metrics for any other pair of labels that includes the first label.

* * * * *